US007678351B2

(12) United States Patent
Iyer et al.

(10) Patent No.: US 7,678,351 B2
(45) Date of Patent: Mar. 16, 2010

(54) HIGH TEMPERATURE $CO_2$ CAPTURE USING ENGINEERED EGGSHELLS: A ROUTE TO CARBON MANAGEMENT

(75) Inventors: Mahesh V. Iyer, Columbus, OH (US); Liang-Shih Fan, Columbus, OH (US)

(73) Assignee: The Ohio State University, Columbus, OH (US)

(*) Notice: Subject to any disclaimer, the term of this patent is extended or adjusted under 35 U.S.C. 154(b) by 896 days.

(21) Appl. No.: 11/384,011

(22) Filed: Mar. 17, 2006

(65) Prior Publication Data

US 2006/0211571 A1 Sep. 21, 2006

Related U.S. Application Data

(60) Provisional application No. 60/662,690, filed on Mar. 17, 2005.

(51) Int. Cl.
*C01B 13/18* (2006.01)
*C01B 3/12* (2006.01)
*B01D 53/12* (2006.01)

(52) U.S. Cl. .................. 423/175; 423/176; 423/177; 423/230; 423/635; 423/637; 423/655; 423/656; 502/400

(58) Field of Classification Search .................. 502/400, 502/418; 423/637, 155, 173, 176, 175, 177, 423/635, 655, 653, 230
See application file for complete search history.

(56) References Cited

U.S. PATENT DOCUMENTS 1,798,802 A * 3/1931 Niles .......................... 423/176

| 3,194,732 | A | 7/1965 | Neuhauser |
| 3,749,380 | A | 7/1973 | Strom et al. |
| 3,864,450 | A | 2/1975 | Takeyama et al. |
| 4,081,522 | A | 3/1978 | Hubble et al. |
| 4,088,736 | A | 5/1978 | Courty et al. |
| 4,115,518 | A | 9/1978 | Delmon et al. |
| 4,174,373 | A | 11/1979 | Yoshida et al. |
| 4,212,854 | A | 7/1980 | Maki et al. |
| 4,215,096 | A | 7/1980 | Sinha et al. |
| 4,226,839 | A | 10/1980 | O'Neill et al. |
| 4,312,280 | A | 1/1982 | Shearer et al. |
| 4,409,124 | A | 10/1983 | Robinson et al. |
| 4,433,981 | A | 2/1984 | Slaugh et al. |
| 4,442,078 | A | 4/1984 | Jalan et al. |
| 4,442,221 | A | 4/1984 | Bishop, III et al. |
| 4,533,532 | A | 8/1985 | Gebhard et al. |

(Continued)

FOREIGN PATENT DOCUMENTS

CA 2401279 A1 8/2001

(Continued)

OTHER PUBLICATIONS

Pauley, C.P. et al., "N-ReN Recovers CO2 from flue gas economically", Technology, Oil Gas Journal, 82(20), May 14, 1984, pp. 87-92.

(Continued)

*Primary Examiner*—Wayne Langel
*Assistant Examiner*—Syed Iqbal
(74) *Attorney, Agent, or Firm*—Standley Law Group LLP

(57) ABSTRACT

Applying an acid treatment to eggshells provides a sorbent with unexpectedly high $CO_2$ capture capacity and ability to regenerate.

20 Claims, 14 Drawing Sheets

U.S. PATENT DOCUMENTS

| | | | |
|---|---|---|---|
| 4,544,542 A | 10/1985 | Angevine et al. | |
| 4,613,487 A | 9/1986 | Yoon et al. | |
| 4,729,889 A | 3/1988 | Flytani-Stephanopoulos et al. | |
| 4,748,010 A | 5/1988 | Walker | |
| 4,772,455 A | 9/1988 | Izumi et al. | |
| 4,855,276 A | 8/1989 | Osborne et al. | |
| 4,871,522 A | 10/1989 | Doyle | |
| 4,937,059 A | 6/1990 | Kolts et al. | |
| 4,950,409 A | 8/1990 | Stanforth | |
| 5,053,238 A | 10/1991 | Zeidler et al. | |
| 5,078,973 A | 1/1992 | Kuroda et al. | |
| 5,084,256 A | 1/1992 | McElroy et al. | |
| 5,087,597 A | 2/1992 | Leal et al. | |
| 5,130,106 A | 7/1992 | Koves et al. | |
| 5,160,715 A | 11/1992 | Pinnavaia et al. | |
| 5,186,914 A | 2/1993 | Yoshihiro et al. | |
| 5,232,793 A | 8/1993 | Miyauchi et al. | |
| 5,275,739 A | 1/1994 | Grant et al. | |
| 5,334,564 A | 8/1994 | Pinnavaia et al. | |
| 5,492,676 A | 2/1996 | Katatani et al. | |
| 5,520,894 A | 5/1996 | Heesink et al. | |
| 5,525,317 A | 6/1996 | Bhat et al. | |
| 5,585,081 A | 12/1996 | Chu et al. | |
| 5,653,785 A | 8/1997 | Horio et al. | |
| 5,779,464 A | 7/1998 | Fan et al. | |
| 5,895,634 A | 4/1999 | Mitsuoka et al. | |
| 5,902,561 A | 5/1999 | Carrea et al. | |
| 5,939,118 A | 8/1999 | Cox et al. | |
| 6,224,839 B1 | 5/2001 | Fan et al. | |
| 6,309,996 B1 | 10/2001 | Fan et al. | |
| 6,358,554 B1* | 3/2002 | Hagiwara et al. | 426/614 |
| 6,569,388 B1 | 5/2003 | Fan et al. | |
| 6,669,917 B2 | 12/2003 | Lyon | |
| 6,682,838 B2 | 1/2004 | Stevens | |
| 6,692,545 B2 | 2/2004 | Gittleman et al. | |
| 6,723,230 B1 | 4/2004 | Chen et al. | |
| 6,737,031 B2 | 5/2004 | Beal et al. | |
| 6,790,430 B1 | 9/2004 | Lackner et al. | |
| 6,834,623 B2 | 12/2004 | Cheng | |
| 6,880,635 B2 | 4/2005 | Vinegar et al. | |
| 6,911,057 B2 | 6/2005 | Lyon | |
| 7,008,967 B2 | 3/2006 | Keyser et al. | |
| 7,067,456 B2 | 6/2006 | Fan et al. | |
| 2002/0197199 A1 | 12/2002 | Fan et al. | |
| 2003/0007918 A1 | 1/2003 | Fan et al. | |
| 2003/0113239 A1 | 6/2003 | Pahlman et al. | |
| 2003/0224932 A1* | 12/2003 | Saaski et al. | 502/416 |
| 2004/0237404 A1 | 12/2004 | Andrus, Jr. et al. | |
| 2004/0261617 A1 | 12/2004 | Stewart | |
| 2005/0042166 A1 | 2/2005 | Kindig et al. | |
| 2005/0175533 A1 | 8/2005 | Thomas et al. | |
| 2005/0197411 A1 | 9/2005 | Lowe et al. | |
| 2006/0039853 A1 | 2/2006 | Fan et al. | |
| 2006/0093540 A1 | 5/2006 | Fan et al. | |
| 2006/0211571 A1 | 9/2006 | Iyer et al. | |
| 2008/0233029 A1 | 9/2008 | Fan et al. | |

FOREIGN PATENT DOCUMENTS

| | | |
|---|---|---|
| CA | 2613698 A1 | 1/2007 |
| CA | 2626772 A1 | 4/2007 |
| DE | 3335499 A1 | 4/1985 |
| DE | 3512169 A1 | 10/1986 |
| DE | 265559 A1 | 3/1989 |
| EP | 0467526 A2 | 1/1992 |
| EP | 1251948 A0 | 10/2002 |
| EP | 1332783 A1 | 8/2003 |
| EP | 1899049 A2 | 3/2008 |
| EP | 1948349 A2 | 7/2008 |
| JP | 49-84956 A | 8/1974 |
| JP | 59-52516 A | 3/1984 |
| JP | 63-171623 A | 7/1988 |
| JP | 10-15353 A | 1/1998 |
| KR | 2002-0040234 A | 5/2002 |
| WO | 97/25138 A1 | 7/1997 |
| WO | 99/56868 A1 | 11/1999 |
| WO | 01/08785 A1 | 2/2001 |
| WO | 01/56689 A1 | 8/2001 |
| WO | 01/74491 A2 | 10/2001 |
| WO | 2007/002792 A2 | 1/2007 |
| WO | 2007/002882 A2 | 1/2007 |
| WO | 2007/046815 A2 | 4/2007 |
| WO | 2007082089 A2 | 7/2007 |
| WO | 2008039783 A2 | 4/2008 |

OTHER PUBLICATIONS

Qiu, K. et al., "Oxidation behaviour of desulphurization residues from gasification and fuel-rich combustion", Fuel, 78, 1999, pp. 225-231.

Raghunathan, K. et al., "A technique for the study of ultrafast gas-solid reactions for residence times less than 100 ms", Rev. Sci. Instrum., 63(11), 1992, 5469-5471.

Rao, A.B. et al., "A Technical, Economic, and Environmental Assessment of Amine-Based CO2 Capture Technology for Power Plant Greenhouse Gas Control", Environ. Sci. Technol., 36(20), 2002, pp. 4467-4475.

Reimer, P. et al., "CO2 Capture from Power Generation", IEA Greenhouse Gas R&D Programme, Cheltenham, Gloucester, U.K., www.ieagreen.org.uk, 2001, 2 pages.

Roark, S.E. et al., "Hydrogen Separation Membranes For Vision 21 Energy Plants", Proceedings of the International Technical Conference on Coal Utilization & Fuel Systems, 27(1), 2002, 11 pages.

Rosen, M.A. et al., "Comparative Efficiency Assessments for a Range of Hydrogen Production Processes", Int. J. Hydrogen Energy, 23(8), 1998, pp. 653-659.

Rosen, M.A. et al., "Thermodynamic Comparison of Hydrogen Production Processes", Int. J. Hydrogen Energy, 21(5), 1996, pp. 349-365.

Ruth, L.A. et al., "Developing Regenerable SO2 Sorbents for Fluidized Bed Coal Combustion Using Thermogravimetric Analysis", Thermochimica Acta, 26, 1978, pp. 241-255.

Sasaoka, E. et al., "Novel Preparation Method of Macroporous Lime from Limestone for High-Temperature Desulfurization", Ind. Eng. Chem. Res., 36(9), 1997, pp. 3639-3646.

Sawada, Y. et al., "Thermal analysis of basic zinc carbonate, Part 1. Carbonation process of zinc oxide powders at 8 and 13° C.", Thermochimic. Acta, 273, 1996, pp. 95-102.

Schubert, H., "Grudlagen des Agglomerierens", Chem.-Ing.-Tech., 51(4), 1979, pp. 266-277.

Shaheen, W.M. et al., "Effect of thermal treatment on physiocochemical properties of pure and mixed manganese carbonate and basic copper carbonate", Thermochimic. Acta, 322, 1998, pp. 117-128.

Shearer, J.A. et al., "Hydration Enhanced Sulfation of Limestone and Dolomite in the Fluidized-Bed Combustion of Coal", Journal of the Air Pollution Control Association, 30(6), Jun. 1980, pp. 684-688.

Simbeck, D.R., "CO2 Mitigation Economics for Existing Coal-fired Power Plants", First National Conference on Carbon Sequestration, Washington DC, May 14-17, 2001, pp. 1-12.

Snow, M.J.H. et al., "Direct Sulfation of Calcium Carbonate", Ind. Eng. Chem. Res., 27(2), 1988, pp. 268-273.

Song, J.H. et al., "Solubility of Carbon Dioxide in Monoethanolamine + Ethylene Glycol + Water and Monoethanolamine + Poly(ethylene glycol) + Water", J. Chem. Eng. Data, 41(3), 1996, pp. 497-499.

Stiegel, G.J. et al., "Hydrogen from coal gasification: An economical pathway to a sustainable energy future", International Journal of Coal Geology, 65, 2006, pp. 173-190.

Tacon, A.G.J., "Utilisation of Chick Hatchery Waste: The Nutritional Characterizes of Day Old Chicks and Egg Shells", Agricultural Wastes, 4, 1982, 335-343.

Thurnau, R.C. et al., "The Behavior of Arsenic in a Rotary Kiln Incinerator", Air Waste Manage. Assoc., 42(2), 1992, pp. 179-184.

Tinkler, M.J. et al., "Towards a Coal-Capable Solid Oxide Fuel Cell System", Proceedings of the 26th International Technical Conference on Coal Utilization and Fuel Systems, Clearwater, Florida, Mar. 5-8, 2001, pp. 569-570.

Tsuchiai, H. et al., "Highly Active Absorbent for SO2 Removal Prepared from Coal Fly Ash", Ind. Eng. Chem. Res., 34(4), 1995, pp. 1404-1411.

Tullin, C. et al., "Direct Sulfation of CaCO3: The Influence of CO2 Partial Pressure", Energy & Fuels, 7(4), 1993, pp. 512-519.

Tullin, C. et al., "Reaction between Calcium Carbonate and Sulfur Dioxide", Energy & Fuels, 3(3) 1989, pp. 284-287.

Uberoi, M. et al., "High-Temperature Removal of Cadmium Compounds Using Solid Sorbents", Environ. Sci. Technol., 25(7), 1991, pp. 1285-1289.

Uberoi, M. et al., "Sorbents for Removal of Lead Compounds from Hot Flue Gases", AIChE Journal, 36(2), 1990, pp. 307-309.

U.S. Department of Energy, "Carbon Sequestration R & D Program Plan: FY 1999—FY 2000", Office of Fossil Energy, Federal Energy Technology Center, www.fetc.doe.gov, Jun. 1999, 28 pages.

Vincent Corporation, Tampa Florida, press release, www.vincentcorp.com, Issue 77, May 19, 1998, 1 page.

Wei, S.H. et al., "High Surface Area Calcium Carbonate: Pore Structural Properties and Sulfation Characteristics", Ind. Eng. Chem. Res., 36(6), 1997, pp. 2141-2148.

White, C.M. et al., "Separation and Capture of CO2 from Large Stationary Sources and Sequestration in Geological Formations-Coalbeds and Deep Saline Aquifers", J. Air & Waste Manage. Assoc., 53, 2003, pp. 645-715.

Wouterlood, H.J. et al., "Removal and Recovery of Arsenious Oxide from Flue Gases", Environmental Science & Technology, 13(1), Jan. 1979, pp. 93-97.

Wu, B. et al., "Multi-Functional Sorbents for the Removal of Sulfur and metallic Contaminants from High Temperature Gases", Environ. Sci. Technol., 29, 1995, pp. 1660-1665.

Wu, S. et al., "Effect of Pore-Size Distribution of Lime on the Reactivity for the Removal of SO2 in the Presence of High-Concentration CO2 at High Temperature", Ind. Eng. Chem. Res., 41(22), 2002, pp. 5455-5458.

Zhang, Z. et al., "Separation of Nitrogen-Carbon Dioxide Mixture by Rapid Pressure Swing Adsorption", Adsorption, 4, 1998, pp. 173-177.

Ziock, H.J. et al., "Zero Emission Coal Power, a New Concept", http://www.netl.doe.gov/publications/proceedings/01/carbon_seq/2b2.pdf, 9 pages.

Fenouil, L.A. et al., "Study of Calcium-Based Sorbents for High-Temperature H2S Removal. 1. Kinetics of H2S Sorption by Uncalcined Limestone", Ind. Eng. Chem. Res., 34(7), 1995, pp. 2324-2333.

Fenouil, L.A. et al., "Study of Calcium-Based Sorbents for High-Temperature H2S Removal. 2. Kinetics of H2S Sorption by Calcined Limestone", Ind. Eng. Chem. Res., 34(7), 1995, pp. 2334-2342.

Froning, G.W., "Recent Advances in Egg Products Research and Development", University of California Egg Processing Workshop, Jun. 2-3, 1998, 7 pages.

Fernández, A.I. et al., "Kinetic study of carbonation of MgO slurries", Hydrometallurgy, 53, 1999, pp. 155-167.

Froning, G.W. et al., "Research Note: Utilisation of Inedible Eggshells and Technical Egg White Using Extrusion Technology", Poultry Science, 69, 1990, pp. 2051-2053.

Germani, M.S. et al., "Vapor-Phase Concentrations of Arsenic, Selenium, Bromine, Iodine, and Mercury in the Stack of a Coal-Fired Power Plant", Environ. Sci. Technol., 22(9), 1988, pp. 1079-1085.

Ghosh-Dastidar, A. et al., "Investigation of High-Reactivity Calcium Carbonate Sorbent for Enhanced SO2 Capture", Ind. Eng. Chem. Res., 35(2), 1996, pp. 598-606.

Ghosh-Dastidar, A. et al., "Selenium Capture Using Sorbent Powders: Mechanisms of Sorption by Hydrated Lime", 1995, 5 pages (also published as Environ. Sci. Technol., 30, 1996, pp. 447-452).

Ghosh-Dastidar, A. et al., "Ultrafast Calcination and Sintering of Ca(OH)2 Powder: Experimental & Modeling", Chemical Engineering Science, 50(13), 1995, pp. 2029-2040.

Gittins, J. et al., "Utilisation of Egg Shell Waste from UK Egg Processing and Hatchery Establishments", ADAS report, http://www.defra.gov.uk.foodrin/poultry/utilisation.htm, May 2002, 7 pages.

Gullett, B.K. et al., "Pore Distribution Changes of Calcium-Based Sorbents Reacting with Sulfur Dioxide", AIChE Journal, 33(10), Oct. 1987, pp. 1719-1726.

Gullett, B.K. et al., "Reduction of Coal-Based Metal Emissions by Furnace Sorbent Injection", Energy and Fuels, 8(5), 1994, pp. 1068-1076.

Gupta, H. et al., "Carbonation-Calcination Cycle Using High Reactivity Calcium Oxide for Carbon Dioxide Separation from Flue Gas", Ind. Eng. Chem. Res., 41(1)6, 2002, pp. 4035-4042.

Gupta, H., "NOx Reduction by Carbonaceous Materials and CO2 Separation Using Regenerative Metal Oxides From Fossil Fuel Based Flue Gas", Dissertation, The Ohio State University, cataloged Oct. 1, 2001, 75 pages.

Gupta, H. et al., "Reactive separation of CO2 using pressure pelletized limestone", Int. J. Environmental Technology and Management, 4,(1/2), 2004, pp. 3-20.

Gupta, H. et al., The Role of CaO in Maximizing Hydrogen Production from Fossil Fuels, Proceedings from Fuel Cell Seminar, San Antonio, Texas, 2004, 4 pages.

Hajaligol, M.R. et al., "Analysis and Modeling of the Direct Sulfation of CaCo3", Ind. Eng. Chem. Res., 27(12), 1988, pp. 2203-2210.

Hartman, M. et al., "Reaction of Sulfur Dioxide with Limestone and the Grain Model", AIChE Journal, 22(3), May 1976, pp. 490-498.

Hartman, M. et al., "Reaction of Sulfur Dioxide with Limestone and the Influence of Pore Structure", Ind. Eng. Chem., Process Des. Develop, 13(3), 1974, pp. 248-253.

Hartman, M. et al., "Reactions between Calcium Oxide and Flue Gas Containing Sulfur Dioxide at Lower Temperatures", AIChE Journal, 39(4), Apr. 1993, pp. 615-624.

Herzog, H. et al., "CO2 Capture, Reuse, and Storage Technologies for Mitigating Global Climate Change", A White Paper, Final Report, Energy Laboratory, DOE Order No. DE-AF22-96PC01257, Jan. 1997, 70 pages.

Herzog, H. et al., "Feasibility, Modeling and Economics of Sequestering Power Plant CO2 Emissions in the Deep Ocean", Environmental Progress, 10(1), Feb. 1991, pp. 64-74.

Heuchel, M. et al., "Adsorption of Carbon Dioxide and Methane and Their Mixtures on an Activated Carbon: Simulation and Experiment", Langmuir, 15(25), 1999, pp. 8695-8705.

Ho, T.C. et al., "Lead and Cadmium Capture by Various Sorbents During Fluidized Bed Combustion/Incineration", Fluidization VIII, International Symposium of the Engineering Foundation, Tours, France, May 14-19, 1995, pp. 899-906.

Ho, T.C. et al., "Metal Behavior and Metal Capture by Sorbents During Fluidized Bed Coal Combustion", Department of Chemical Engineering, Lamar University, pp. 281-286.

Hufton, J.R. et al., "Sorption-Enhanced Reaction Process for Hydrogen Production", AIChE Journal, 45(2), Feb. 1999, pp. 248-256.

Ida, J.I. et al., "Mechanism of High-Temperature CO2 Sorption on Lithium Zirconate", Environ. Sci. Technol., 37(9), 2003, pp. 1999-2004.

Iyer, M.V. et al., "Multicyclic Study on the Simultaneous Carbonation and Sulfation of High Reactivity CaO", Ind. Eng. Chem. Res., 43(14), 2004, pp. 3939-3947.

Iyer, M. et al., "Novel Calcium-based Reactive Separation of CO2 from Flue Gas: Effect of SO2", Presented at the 20th Annual International Pittsburgh Coal Conference, Pittsburgh, PA, Paper S-1, 2003, pp. 1-11.

Jadhav, R.A. et al., "Mechanism of Selenium Sorption by Activated Carbon", The Canadian Journal of Chemical Engineering, 78, Feb. 2000, pp. 168-174.

Jia, C.Q. et al., "A kinetic study of the generation of hydrogen sulphide from aqueous calcium sulphide slurry with carbon dioxide", Waste Process. Recycl. Min. Metall. Ind., Proc. Int. Symp., 1992, pp. 215-227.

Jozewicz, W. et al., "Fly Ash Recycle in Dry Scrubbing", Environmental Progress, 5(4), Nov. 1986, pp. 219-224.

Jozewicz, W. et al., "Reaction Mechanisms of Dry Ca-Based Sorbents with Gaseous HCl", Ind. Eng. Chem. Res., 34(2), 1995, pp. 607-612.

Jozewicz, W. et al., "Reactivation of Solids from Furnace Injections of Limestone for SO2 Control", Environ. Sci. Technol., 21(7), 1987, pp. 664-670.

Kaplan, L.J., Cost-saving process recovers CO2 from power-plant fluegas, Chemical Engineering, 89(24), 1982, pp. 30-31.

Kato, M. et al., "Carbon dioxide absorption by lithium orthosilicate in a wide range of temperature and carbon dioxide concentrations", Journal of materials Science Letters, 21, 2002, pp. 485-487.

Kato, Y. et al., "Kinetic feasibility of a chemical heat pump for heat utilization of high-temperature processes", Applied Thermal Engineering, 19, 1999, pp. 239-254.

Kato, Y. et al., "Utilization of High Temperature Heat From Nuclear Reactor Using Inorganic Chemical Heat Pump", Progress in Nuclear Energy, 32(3/4), 1998, pp. 563-570.

Keairns, D.L. et al., "Sulfur Emission Control With Limestone/Dolomite in Advanced Fossil Fuel-Processing Systems", Environmental Aspects of Fuel Conversion Technology, St. Louis, MO, 1974; Research Triangle Institute: Research Triangle Park, NC, 1974, pp. 135-146.

Keeling, C.D., Atmospheric CO2 concentrations (ppmv) derived from in situ ari samples collected at Mauna Loa Observatory, Hawaii, http://cdiac.esd.ornl.gov/ftp/maunaloa-co2/maunaloa.co2, Jul. 25, 2003, 2 pages.

Khan, T. et al., "Improving Limestone Utilization in Circulating Fluidized Bed Combustors Through the Reactivation and Recycle of Partially Utilized Limestone in the Ash", Fluidized Bed Combustion, 2, ASME, 1995, pp. 831-840.

Kikkinides, E.S. et al., "Concentration and Recovery of CO2 From Flue Gas by Pressure Swing Adsorption", Ind. Eng. Chem. Res., 32(11), 1993, pp. 2714-2720.

Kirchgessner, D.A., et al., "Enhancement of Reactivity in Surfactant-Modified Sorbents for Sulfur Dioxide Control", Ind. Eng. Chem. Res., 28(4), 1989, pp. 413-418.

Kirchgessner, D.A. et al., "Lignosulfonate-Modified Calcium Hydroxide for Sulfur Dioxide Control", Ind. Eng. Chem. Res., 26(11), 1987, pp. 2397-2400.

Li, G.G. et al., "CO2 reaction with Ca(OH)2 during SO2 removal with convective pass sorbent injection and high temperature filtration", Environ Eng Policy, 2, 2000, pp. 47-56.

Lin, S.Y. et al., "Developing an innovative method, HyPr-RING, to Product Hydrogen from hydrocarbons", Energy Conversion and Management, 43, 2002, pp. 1283-1290.

Lin, S. et al., "Process analysis for hydrogen production by reaction integrated novel gasification (HyPr-RING)", Energy Conversion and Management, 46, 2005, pp. 869-880.

Mahuli, S. et al., "Mechanism of Arsenic Sorption by Hydrated Lime", Environ. Sci. Technol., 31(11), 1997, pp. 3226-3231.

Mahuli, S.K. et al., "Pore-Structure Optimization of Calcium Carbonate for Enhanced Sulfation", AIChE Journal, 43 (9), 1997, pp. 2323-2335.

Markowski, G.R. et al., "Trace Element Concentration as a Function of Particle Size in Fly Ash from a Pulverized Coal Utility Boiler", Env. Sci. Tech., 19(9), 1985, pp. 796-804.

Martinez, J.C. et al., Reactivation of Fly Ash and Ca(OH)2 Mixtures for SO2 Removal of Flue Gas, Ind. Eng. Chem. Res., 30(9), 1991, pp. 2143-2147.

Marquis, D.L., "Reactivation of Spent CFB Limestone by Hydration", Master of Science in Engineering Thesis, The University of New Brunswick, Fredericton, NB, Sep. 1992, 179 pages.

Mess, D. et al., "Product Layer Diffusion during the Reaction of Calcium Oxide With Carbon Dioxide", Energy & Fuels, 13(5), 1999, pp. 999-1005.

Milne, C.R. et al., "High-Temperature, Short-Time Sulfation of Calcium-Based Sorbents. 2. Experimental Data and Theoretical Model Predictions", Ind. Eng. Chem. Res., 29(11), 1990, pp. 2201-2214.

Mimura, T. et al., "Development of Energy Saving Technology for Flue Gas Carbon Dioxide Recovery in Power Plant by Chemical Absorption Method and Steam System", Energy Convers. Manage, 38, Suppl. P, 1997, pp. S57-S62.

Newsome, D.S., "The Water-Gas Shift Reaction", Catal. Rev. Sci. Eng., 21(2), 1980, pp. 275-318.

Nishev, T. et al., "Kinetics of Carbonization of Calcium Sulfide in Water Suspension", J. Chem. Tech. Biotechnol., 56, 1993, pp. 271-272.

Oakeson, W.G. et al., "Effect of CO2 Pressure on the Reaction with CaO", Journal of the American Ceramic Society, 62(11-12), 1979, pp. 556-558.

Ondov, J.M. et al., "Emissions and Particle-Size Distributions of Minor and Trace Elements at Two Western Coal-Fired Power Plants Equipped with Cold-Side Electrostatic Precipitators", Environmental Science & Technology, 13(8), Aug. 1979, pp. 946-953.

Ortiz, L.A. et al., "Hydrogen Production Using Sorption Enhanced Reaction", Ind. Eng. Chem. Res., 40(23), 2001, pp. 5102-5109.

Abanades, J.C., "The maximum capture efficiency of CO2 using a carbonation/calcinations cycle of CaO/CaCO3", Chemical Engineering Journal, 90, 2002, pp. 303-306.

Abanades, J.C. et al., "Conversion Limits in the Reaction of CO2 with Lime", Energy and Fuels, 17(2), 2003, pp. 308-315.

Adánez, J. et al., "Regeneration of Sulfided Dolomite with Steam and Carbon Dioxide", Energy & Fuels, 15(1), 2001, pp. 85-94.

Agnihorti, R. et al., "Influence of Surface Modifiers on the Structure of Precipitated Calcium Carbonate", Ind. Eng. Chem. Res., 38(6), 1999, pp. 2283-2291.

Agnihotri, R. et al., "Sorbent/Ash Reactivation for Enhanced SO2 Capture Using a Novel Carbonation Technique", Ind. Eng. Chem. Res., 38(3), 1999, pp. 812-819.

Al-Shawabkeh et al., Enhanced SO2 Abatement with Water-Hydrated Dolomitic Particles, AIChE Journal, 43(1), Jan. 1997, 173-179.

Balasubramanian, B. et al., "Hydrogen from methane in a single-step process", Chemical Engineering Science, 54, 1999, pp. 3534-3552.

Barker, R., "The Reactivity of Calcium Oxide Towards Carbon Dioxide and Its Use for Energy Storage", J. Appl. Chem. Biotechnol., 24, 1974, pp. 221-227.

Barker, R., The Reversibility of the Reaction CaCO3 CaCO+CO2, J. Appl. Chem. Biotechnol., 23, 1973, pp. 733-742.

Beruto, D. et al., "Calcium oxides of high reactivity", Nature, 263, Sep. 16, 1976, pp. 221-222.

Beruto, D. et al., "Characterization of the Porous CaO Particles Formed by Decomposition of CaCO3 and Ca(OH) 2 in Vacuum", Journal of the American Ceramic Society, 63(7/8), 1980, pp. 439-443.

Bhatia, S.K. et al., "The Effect of Pore Structure on Fluid-Solid Reactions: Application to the SO2-Lime Reaction", AIChE Journal, 27(2), Mar. 1981, pp. 226-234.

Bhatia, S.K. et al., "Effect of the Product Layer on the Kinetics of the CO2-Lime Reaction", AIChE Journal, 29(1), Jan. 1983, pp. 79-86.

Biswas, S.C. et al., "Hydrgen Sulphide from Reduced Gypsum", Fert. Technol., 13(4), 1976, pp. 255-258.

Blauwhoff, P.M.M. et al., "A Study on the Reaction Between CO2 and Alkanolamines in Aqueous Solutions", Chemical Engineering Science, 39(2), 1984, pp. 207-225.

Borgwardt, R.H., "Sintering of Nascent Calcium Oxide", Chemical Engineering Science, 44(1), 1989, pp. 53-60.

Bortz, S. et al., "Recent IFRF Fundamental and Pilot Scale Studies on the Direct Sorbent Injection Process", International Flame Research Foundation, 1985, pp. 17-1-17-22.

Brooks, M.W. et al., "Recovery of Calcium Carbonate and Hydrogen Sulfide from Waste Calcium Sulfide", Ind. Eng. Chem. Res., 36(10), 1997, pp. 4236-4242.

Bruce, K.R. et al., "Comparative SO2 Reactivity of CaO Derived from CaCO3 and Ca(OH)2", AIChE Journal, 35(1), Jan. 1989, pp. 37-41.

Butt, D.P. et al., "Kinetics of Thermal Dehydroxylation and Carbonation of Magnesium Hydroxide", J. Am. Ceram. Soc., 79(7), 1996, pp. 1892-1898.

Chauk, S.S. et al., "Kinetics of High-Pressure Removal of Hydrogen Sulfide Using Calcium Oxide Powder", AIChE Journal, 46(6), Jun. 2000, pp. 1157-116.

Couturuer, M.F. et al., "Reactivation of Partially-Sulphated Limestone Particles form a CFB Combustor by Hydration", The Canadian Journal of Chemical Engineering, 72, Feb. 1994, pp. 91-97.

Dash, S. et al., "Nanocrystalline and metastable phase formation in vacuum thermal decomposition of calcium carbonate", Thermochimica Acta, 363, 2000, pp. 129-135.

Davis, C. et al., "High value opportunities from the chicken egg", RIRDC Publication No. 02/094, Aug. 2002, 69 pages.

Davison, R.L. et al., "Trace Elements in Fly Ash", Environmental Science & Technology, 8(13), Dec. 1974, pp. 1107-1113.

Dedman, A.J. et al., "Calcium Cyanamide Synthesis, Part 4. The Reaction CaO+CO2=CaCO3" Trans. Faraday Soc., 58, 1962, pp. 2027-2035.

Deshmukh, A.C. et al., "Preservation of Hatchery Waste by Lactic Acid Fermentation. 2. Large Scale Fermentation and Feeding Trial to Evaluate Feeding Value.", Poultry Science, 76, 1997, pp. 1220-1226.

Dismukes, E.B., "Trace element control in electrostatic precipitators and fabric filters", Fuel Processing Technology, 39, 1994, pp. 403-416.

Doong, S. et al., "A Novel Membrane Reactor For Direct Hydrogen Production From Coal", DOE Final Technical Report, http://www.osti.gov/bridge/servlets/purl/876470-v2hbxY/876470.PDF, Jan. 2006, 58 pages.

Fan, L.S. et al., "Clean Coal Technologies: OSCAR and CARBONOX Commercial Demonstrations", AIChE Journal, 48(10), Oct. 2002, pp. 2115-2123.

Abanades, J.C. et al., "Capture of CO2 from Combustion Gases in a Fluidized Bed of CaO", AIChE Journal, 50(7), Jul. 2004, pp. 1614-1622.

Abanades, J.C. et al., "Sorbent Cost and Performance in CO2 Capture Systems", Ind. Eng. Chem. Res., 43(13), 2004, pp. 3462-3466.

Denton, L. et al., "Simultaneous Production of High-Purity Hydrogen and Sequestration-Ready CO2 From Syngas", GE Final Technical Report, Dec. 2003, 108 pages.

Iyer, M. et al., "Calcium Looping process for high temperature high presser hydrogen production with in-situ CO2 and sulfur capture", National Symposium on Chemical Reaction Engineering, Feb. 2007, 1 page, Houston, Texas.

Iyer, M. et al., "Enhanced Hydrogen Production with in-situ CO2 capture in a Single Stage Reactor", Proc. 23rd Annu. Int. Pittsburgh Coal Conference, Sep. 2006, 17 pages, Pittsburgh, Pennsylvania.

Li, Y.U. et al., "The effect of the binder on the manufacture of a 5A zeolite monolith", Powder Technology, 116, 2001, pp. 85-96.

Manovic, V. et al., "Parametric Study on the CO2 Capture Capacity of a CaO-Based Sorbents in Looping Cycles", Energy & Fuels, 22(3), 2008, 1851-1857.

Manovic, V. et al., "Sequential SO2/CO2 capture enhanced by steam reactivation of a CaO-based sorbent", Fuel, 87, 2008, pp. 1564-1573.

Manovic, V. et al., "Steam hydration of sorbents from a dual fluidized bed CO2 looping cycle reactor", Fuel, 87, 2008, pp. 3344-3352.

Manovic, V. et al., "Sulphation and carbonation properties of hydrated sorbents from a fluidized bed CO2 looping cycle reactor", Fuel, 87, 2008, pp. 2923-2931.

Manovic, V. et al., "Thermal Activation of CaO-Based Sorbent and Self-Reactivation during CO2 Capture Looping Cycles", Environmental Science & Technology, 42(11), 2008, pp. 4170-4174.

Sun, P. et al., "The Effect of CaO Sintering on Cyclic CO2 Capture in Energy Systems", Environmental and Energy Engineering, 53(9), Sep. 2007, pp. 2432-2442.

Sun, P. et al., "Removal of CO2 by Calcium-Based Sorbents in the Presence of S02", Energy & Fuels, 21(1), 2007, pp. 163-170.

Wang, J. et al., "On the Decay Behavior of the CO2 Absorption Capacity of CaO-Based Sorbents", Ind. Eng. Chem. Res., 44(3), 2005, pp. 627-629.

Zeman, F., "Effect of steam hydration on performance of lime sorbent for CO2 capture", International Journal of Greenhouse Gas Control, 2, 2008, pp. 203-209.

Zheng, L. et al., "Comparison of Shell, Texaco, BGL and KRW gasifiers as part of IGCC plant computer simulations", Energy Conversion and Management, 46, 2005, pp. 1767-1779.

Pauley, C.P. et al., "N-ReN Recovers CO2 from flue gas economically", Technology, Oil Gas Journal, 82(20), May 14, 1984, pp. 87-92.

Qiu, K. et al., "Oxidation behaviour of desulphurization residues from gasification and fuel-rich combustion", Fuel, 78, 1999, pp. 225-231.

Raghunathan, K. et al., "A technique for the study of ultrafast gas-solid reactions for residence times less than 100 ms", Rev. Sci. Instrum., 63(11), 1992, 5469-5471.

Rao, A.B. et al., "A Technical, Economic, and Environmental Assessment of Amine-Based CO2 Capture Technology for Power Plant Greenhouse Gas Control", Environ. Sci. Technol., 36(20), 2002, pp. 4467-4475.

Reimer, P. et al., "CO2 Capture from Power Generation", IEA Greenhouse Gas R&D Programme, Cheltenham, Gloucester, U.K., www.ieagreen.org.uk, 2001, 2 pages.

Roark, S.E. et al., "Hydrogen Separation Membranes For Vision 21 Energy Plants", Proceedings of the International Technical Conference on Coal Utilization & Fuel Systems, 27(1), 2002, 11 pages.

Rosen, M.A. et al., "Comparative Efficiency Assessments for a Range of Hydrogen Production Processes", Int. J. Hydrogen Energy, 23(8), 1998, pp. 653-659.

Rosen, M.A. et al., "Thermodynamic Comparison of Hydrogen Production Processes", Int. J. Hydrogen Energy, 21 (5), 1996, pp. 349-365.

Ruth, L.A. et al., "Developing Regenerable SO2 Sorbents for Fluidized Bed Coal Combustion Using Thermogravimetric Analysis", Thermochimica Acta, 26, 1978, pp. 241-255.

Sasaoka, E. et al., "Novel Preparation Method of Macroporous Lime from Limestone for High-Temperature Desulfurization", Ind. Eng. Chem. Res., 36(9), 1997, pp. 3639-3646.

Sawada, Y. et al., "Thermal analysis of basic zinc carbonate, Part 1. Carbonation process of zinc oxide powders at 8 and 13° C.", Thermochimic. Acta, 273, 1996, pp. 95-102.

Schubert, H., "Grudlagen des Agglomerierens", Chem.-Ing.-Tech., 51(4), 1979, pp. 266-277.

Shaheen, W.M. et al., "Effect of thermal treatment on physiocochemical properties of pure and mixed manganese carbonate and basic copper carbonate", Thermochimic. Acta, 322, 1998, pp. 117-128.

Shearer, J.A. et al., "Hydration Enhanced Sulfation of Limestone and Dolomite in the Fluidized-Bed Combustion of Coal", Journal of the Air Pollution Control Association, 30(6), Jun. 1980, pp. 684-688.

Simbeck, D.R., "CO2 Mitigation Economics for Existing Coal-fired Power Plants", First National Conference on Carbon Sequestration, Washington DC, May 14-17, 2001, pp. 1-12.

Snow, M.J.H. et al., "Direct Sulfation of Calcium Carbonate", Ind. Eng. Chem. Res., 27(2), 1988, pp. 268-273.

Song, J.H. et al., "Solubility of Carbon Dioxide in Monoethanolamine + Ethylene Glycol + Water and Monoethanolamine + Poly(ethylene glycol) + Water", J. Chem. Eng. Data, 41(3), 1996, pp. 497-499.

Stiegel, G.J. et al., "Hydrogen from coal gasification: An economical pathway to a sustainable energy future", International Journal of Coal Geology, 65, 2006, pp. 173-190.

Tacon, A.G.J., "Utilisation of Chick Hatchery Waste: The Nutritional Characterizes of Day Old Chicks and Egg Shells", Agricultural Wastes, 4, 1982, 335-343.

Thurnau, R.C. et al., "The Behavior of Arsenic in a Rotary Kiln Incinerator", Air Waste Manage. Assoc., 42(2), 1992, pp. 179-184.

Tinkler, M.J. et al., "Towards a Coal-Capable Solid Oxide Fuel Cell System", Proceedings of the 26th International Technical Conference on Coal Utilization and Fuel Systems, Clearwater, Florida, Mar. 5-8, 2001, pp. 569-570.

Tsuchiai, H. et al., "Highly Active Absorbent for SO2 Removal Prepared from Coal Fly Ash", Ind. Eng. Chem. Res., 34(4), 1995, pp. 1404-1411.

Tullin, C. et al., "Direct Sulfation of CaCO3: The Influence of CO2 Partial Pressure", Energy & Fuels, 7(4), 1993, pp. 512-519.

Tullin, C. et al., "Reaction between Calcium Carbonate and Sulfur Dioxide", Energy & Fuels, 3(3) 1989, pp. 284-287.

Uberoi, M. et al., "High-Temperature Removal of Cadmium Compounds Using Solid Sorbents", Environ. Sci. Technol., 25(7), 1991, pp. 1285-1289.

Uberoi, M. et al., "Sorbents for Removal of Lead Compounds from Hot Flue Gases", AIChE Journal, 36(2), 1990, pp. 307-309.

U.S. Department of Energy, "Carbon Sequestration R & D Program Plan: FY 1999-FY 2000", Office of Fossil Energy, Federal Energy Technology Center, www.fetc.doe.gov, Jun. 1999, 28 pages.

Vincent Corporation, Tampa Florida, press release, www.vincentcorp.com, Issue 77, May 19, 1998, 1 page.

Wei, S.H. et al., "High Surface Area Calcium Carbonate: Pore Structural Properties and Sulfation Characteristics", Ind. Eng. Chem. Res., 36(6), 1997, pp. 2141-2148.

White, C.M. et al., "Separation and Capture of CO2 from Large Stationary Sources and Sequestration in Geological Formations-Coalbeds and Deep Saline Aquifers", J. Air & Waste Manage. Assoc., 53, 2003, pp. 645-715.

Wouterlood, H.J. et al., "Removal and Recovery of Arsenious Oxide from Flue Gases", Environmental Science & Technology, 13(1), Jan. 1979, pp. 93-97.

Wu, B. et al., "Multi-Functional Sorbents for the Removal of Sulfur and metallic Contaminants from High Temperature Gases", Environ. Sci. Technol., 29, 1995, pp. 1660-1665.

Wu, S. et al., "Effect of Pore-Size Distribution of Lime on the Reactivity for the Removal of SO2 in the Presence of High-Concentration CO2 at High Temperature", Ind. Eng. Chem. Res., 41(22), 2002, pp. 5455-5458.

Zhang, Z. et al., "Separation of Nitrogen-Carbon Dioxide Mixture by Rapid Pressure Swing Adsorption", Adsorption, 4, 1998, pp. 173-177.

Ziock, H.J. et al., "Zero Emission Coal Power, a New Concept", http://www.netl.doe.gov/publications/proceedings/01/carbon_seq/2b2.pdf, 9 pages.

* cited by examiner

HIGH TEMPERATURE CO₂ CAPTURE USING ENGINEERED EGGSHELLS: A ROUTE TO CARBON MANAGEMENT

RELATED APPLICATION DATA

This application claims the priority benefit of U.S. Provisional Application Ser. No. 60/662,690, filed Mar. 17, 2005, which is hereby incorporated herein by reference.

TECHNICAL FIELD OF THE INVENTION

The present invention relates to a sorbent for the separation of $CO_2$ from gas mixtures and the method of making the sorbent.

BACKGROUND OF THE INVENTION

The ever increasing anthropogenic $CO_2$ emission due to the consumption of ~10 TW of fossil fuel energy, accounts for over half of the enhancement in the greenhouse effect that causes global warming. International protocols targeting reduction in greenhouse gases are prompting the development of several carbon management technologies. However, economical carbon sequestration, which avoids $CO_2$ emissions to the atmosphere, is a definitive solution. Numerous economic analyses indicate that $CO_2$ capture dominates the cost associated with the envisaged threefold scheme, which includes capture, transportation and sequestration. $CO_2$ separation using conventional technologies such as adsorption, absorption, cryogenic distillation, and membrane separation impose severe energy penalties, increasing the cost of electricity production by 34-75%. The $CO_2$ capture efficiency of these processes is favored at low temperatures and high pressures. However, under actual combustion based flue gas conditions of high temperatures and low pressures, reactive separation process based on alternating carbonation and calcination reactions (CCR) of metal oxides offer unique advantages in the reduction of the overall parasitic energy consumptions.

Among the many metal oxides, calcium oxide (CaO) has been identified as the most feasible metal oxide candidate sorbent for the CCR scheme due to its high $CO_2$ sorption capacity, low cost and its natural abundance.[18] In addition, the CCR scheme can be used to maximize hydrogen production at high temperature and pressure from synthesis gas mixtures by driving the equilibrium limited Water Gas Shift Reaction (WGSR) forward through incessant $CO_2$ removal (eqn. 2). The reaction scheme follows:

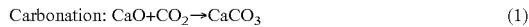

Carbonation: $CaO + CO_2 \rightarrow CaCO_3$     (1)

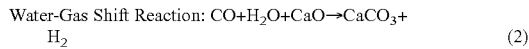

Water-Gas Shift Reaction: $CO + H_2O + CaO \rightarrow CaCO_3 + H_2$     (2)

Calcination: $CaCO_3 \rightarrow CaO + CO_2$     (3)

Several studies indicate that typical calcium sorbents do not achieve stoichiometric conversions due to the dominance of micropores which cause pore mouth closure and pore pluggage. A high reactivity Precipitated Calcium Carbonate (PCC) based sorbent, dominated by 5-20 nm sized mesopores attains near stoichiometric conversion towards many gas-solid reactions. The 10-50 micron sized PCC-CaO fines, injected at 550-700° C. for $CO_2$ capture (eqns. 1 and 2), are separated by high temperature particulate capture devices (HT-PCD) and thermally regenerated in a separate calciner (eqn 3) to produce a sequestration ready $CO_2$ stream. The regenerated CaO fines are re-injected for $CO_2$ capture in the subsequent cycle. The commercial deployment of a CaO fines-based CCR process is challenged by sorbent losses in the HT-PCD and separation of these fines from fly-ash due to similar particle size distribution (PSD).

It is a goal of the present invention to produce Here we show that chicken eggshells (ES), currently an environmental nuisance, are excellent reactive agglomerates that depict sustained high reactivity towards carbonation over multiple CCR cycles. The typical dry eggshell, an excellent bioceramic composite, comprises of two predominantly calcitic ($CaCO_3$) layers and the innermost shell membrane layer. The organic material in the eggshell has excellent calcium binding properties and leads to a strong calcitic shell by self-organizing the calcite crystals during the natural eggshell formation process. Poultry eggs, used for a variety of products, result in massive amounts of eggshell waste that incur expensive disposal costs. The average annual per capita egg consumption in the United States is about 257 in 2001. However, annual eggshell wastes from various hatcheries and egg breaking industries amount to over 190,000 tons. Current disposal options include the most basic landfill, land applications including soil mixing and organic farming, and recycling in poultry diets. Of these, landfill is the easiest option as other alternatives involve significant processing costs. Eggshells, considered as organic wastes, require about $20-40/ton for landfill disposal in the U.S. This problem is further exacerbated in European countries where land comes at a premium. In addition, landfill taxes in the United Kingdom increase this disposal cost to about £30-50/ton. Therefore, the usage of refuse eggshells in this high temperature $CO_2$ capture technology as reactive agglomerates is simultaneously a comprehensive solution to two global environmental concerns.

This study demonstrates the novel use of refuse chicken eggshells at high temperatures as reactive agglomerates to separate $CO_2$ from large point sources such as fossil fuel fired power plants. Acetic acid treatment simultaneously generates marketable membranes while enhancing eggshell reactivity. In addition, intermediate hydration regenerates deactivated ES sorbent thereby significantly enhancing its usage over multiple batches of CCR cycles. Eggshells overcome the engineering challenges confronting the deployment of fines based CCR process. Naturally occurring eggshells obviate the necessity to formulate expensive agglomerates from high reactivity calcium fines thereby making the process economical.

The success of this project will facilitate the development of an inexpensive direct carbon capture process from existing combustion units as well as enhance $H_2$ production at high temperature/pressure and purity from fossil fuels such as coal. Coal reserves, amounting to 500 billion tons, are abundant in the US and are our long-term hope for domestic energy security, provided environmentally benign processes are developed for its usage. This project addresses the capture (separation) of $CO_2$ from both combustion based flue gas and from gasification based fuel gas. Implementation of off-site $CO_2$ sequestration schemes such as geological, mineral, and ocean sequestration can be realized only if the high cost associated with $CO_2$ separation from flue/fuel gas is overcome. To date, amine scrubbing is the only technique being envisaged for commercial scale operation. However, numerous economical analyses have unequivocally proven that integration of amine scrubbing increased the cost of electricity produced by 50-200% on existing coal fired boilers (Herzog et al., 1997, Simbeck, 2001, Rao and Rubin, 2002). A revolutionary approach to direct capture of $CO_2$ from flue/fuel gas involves the usage of heterogeneous non-catalytic gas solid carbonation between $CO_2$ and calcium oxide (CaO) to form calcium carbonate (CaCO$_3$), thereby accomplishing the separation of CO$_2$ from the flue gas stream (Gupta and Fan, 2002). The carbonation reaction occurs as written below:

$$CaO + CO_2 \rightarrow CaCO_3 \quad \Delta H = -178 \text{ kJ/mol}$$

The reacted sorbent is then isolated from the flue gas and separately calcined to yield pure CO$_2$ gas (that can be then transported to its sequestration sites) and CaO that is recycled back for further carbonation in the next cycle. This process occurs repeatedly over multiple cycles. The calcination reaction is as follows:

$$CaCO_3 \rightarrow CaO + CO_2 \quad \Delta H = +178 \text{ kJ/mol}$$

The flue gas generated by coal combustion typically contains 10-15% CO$_2$, 3-4% O$_2$, 5-7% H$_2$O and 500-3000 ppm SO$_2$. Primarily four gas-solid reactions can occur when CaO is exposed to flue gas from coal combustion. CaO can undergo hydration, carbonation and sulfation reactions with H$_2$O, CO$_2$ and SO$_2$, respectively. In addition, SO$_2$ can react with the CaCO$_3$ formed due to the carbonation reaction, thereby causing direct sulfation of the carbonate. These can be stoichiometrically represented as:

Hydration: $CaO + H_2O \rightarrow Ca(OH)_2$ (1)

Carbonation: $CaO + CO_2 \rightarrow CaCO_3$ (2)

CaO Sulfation: $CaO + SO_2 + \frac{1}{2}O_2 \rightarrow CaSO_4$ (3)

CaCO$_3$ Sulfation: $CaCO_3 + SO_2 + \frac{1}{2}O_2 \rightarrow CaSO_4 + CO_2$ (4)

Thermodynamic calculations were performed to obtain equilibrium curves for the partial pressures of H$_2$O (P$_{H2O}$), CO$_2$ (P$_{CO2}$) and SO$_2$ (P$_{SO2}$) as a function of temperature for each of these reactions using HSC Chemistry v 5.0 (Outokumpu Research Oy, Finland) (Iyer et al., 2004).

The equilibrium curves depicting the temperature dependent equilibrium partial pressures of H$_2$O and CO$_2$ for the hydration and carbonation reactions are shown in FIG. 1. From these equilibrium curves, we can predict that moisture does not react with CaO beyond 350° C. in the 5-7% concentration range, typical of combustion flue gas. At 10% CO$_2$, the equilibrium temperature for CaO—CaCO$_3$ system is 760° C. Therefore, the temperature of the carbonator needs to be kept below 760° C. in order to effect the carbonation of CaO in a 10% CO$_2$ stream. A temperature of 700° C. offers a reasonable rate of carbonation and calcination reactions and enabled us to carry out multiple carbonation-calcination reaction (CCR) cycles under isothermal conditions. Thermodynamic data for the equilibrium temperature versus SO$_2$ concentration for the sulfation of CaO and direct sulfation of CaCO$_3$ are shown in FIG. 2. The SO$_2$ concentration for the sulfation of CaO system is depicted in terms of ppmv for a total system pressure of 1 bar at 4% O$_2$. At 700° C., the equilibrium partial pressure of SO$_2$ is 1.84 and 5.72 ppt (parts per trillion) for the sulfation of CaO and the direct sulfation of CaCO$_3$. Since SO$_2$ concentration in the inlet flue gas is in the 500-3000 ppm range, sulfation of CaO and the CaCO$_3$ will definitely occur until virtually all SO$_2$ is consumed, leading to the formation of thermally stable CaSO$_4$. The cumulative buildup of CaSO$_4$ in each cycle reduces the CO$_2$ sorption capacity of the CaO sorbent over subsequent CCR cycles (Iyer et al., 2004). This study shows the existence of an optimized residence time and temperature that maximizes $X_{CO2}/X_{SO2}$. Experiments will be conducted to quantify this parasitic sulfation on the CO$_2$ sorption capacity for the new sorbents under consideration in this project. A possible schematic of a CaRS-CO$_2$ process retrofit is shown in FIG. 3. Such a process ensures that the majority of the flue gas does not necessitate any change in its temperature and pressure, while energy is expended to compress CO$_2$, which is only 5-20 vol % of the total flue gas.

Enhanced Hydrogen Production from WGSR

Fuel gas obtained from fossil fuel gasification can be subjected to the Water Gas Shift Reaction (WGSR) by the addition of steam to enhance H$_2$ production. The WGSR can be expressed stoichiometrically as:

$$CO + H_2O \leftrightarrow CO_2 + H_2 \quad \Delta H = -40.6 \text{ kJ/mol} \quad (5)$$

However, the WGS reaction is equilibrium limited. The equilibrium constant for the WGSR, expressed as $$K_{WGSR} = \frac{[CO_2][H_2]}{[CO][H_2O]},$$

falls with increasing temperature. Hence, thermodynamics forces this reaction to be conducted catalytically in two stages: (1) high temperature shift (250-500° C.) using iron catalysts and (2) low temperature shift (210-270° C.) using copper-based catalysts (Gerhartz, 1993; Bohlbro, 1969). Membranes can separate H$_2$ at high temperature as it is formed, thereby aiding the forward reaction (Roark et al., 2002). While numerous research endeavors have been completed to date, membrane separation remains uneconomical and the H$_2$ separated is at low pressure as well. We propose to remove CO$_2$ from the reacting water-gas mixture through its carbonation with CaO, thereby driving the equilibrium limited WGS reaction forward. We can thus make a higher purity H$_2$ stream in a CO$_2$ sequestration ready manner. Challenges in WGSR over existing fuel gas streams include the intolerance of copper-based catalysts to small quantities of sulfur (<0.1 ppm) and the relatively high steam consumption. The steam to CO ratio at 550° C. can be as high as 50 in a single-stage operation or 7.5 for the more expensive dual-stage process to obtain 99.5% pure H$_2$ (David, 1980). Recently, Harrison and co-workers reported a single-step sorption-enhanced process that produced 97% pure H$_2$, by steam-methane reforming (SMR) and WGSR coupled with the carbonation of dolomite (Balasubramanian et al., 1999; Lopez Ortiz and Harrison, 2001). Thermodynamics indicates that CaO can react with CO$_2$ until the partial pressure of CO$_2$ falls below 100 ppm at 600° C. (FIG. 1). Hence, the continuous removal of product CO$_2$ from the WGSR chamber will incessantly drive the equilibrium-limited WGSR forward leading to stoichiometric H$_2$ production. Besides, this reaction occurs at higher temperature (compared to WGSR), which favors fast kinetics. The steam consumption can also be drastically cut because very low CO$_2$ concentration can be realistically achieved. Similar to flue gas, CaO can undergo hydration in water gas, thereby decreasing the net CO$_2$ capture capacity of CaO. For effective carbonation, we have to operate in that thermodynamic regime where hydration is not feasible but carbonation takes place. For a typical gasifier in which the moisture composition ranges from 12-20 atm (P$_{H2O}$), CaO hydration is prevented above 550-575° C., as seen from FIG. 1.

FIG. 4 shows that the flow of exiting water gas from the gasifier is shifted to produce more H$_2$ through the injection of steam. The simultaneous scavenging of CO$_2$ down to ppm levels by injection of CaO particles and further WGSR by the high temperature catalysts maximizes H$_2$ production.

Research in the general area of sorbent synthesis has been ongoing for the past 12 years at The Ohio State University (OSU). OSU researchers have been actively developing this CaRS-CO$_2$ process over the last four years. We have shown that the porosity of the CaO structure plays a dominant role in the carbonation kinetics and ultimate CO$_2$ sorption capacity. CaO obtained by the calcination of naturally occurring materials such as limestone (Linwood Carbonate, LC and Linwood hydrate, LH) and dolomite are microporous in nature and unable to react to a high degree due to pore pluggage and pore mouth closure limitations (extent of carbonation: 58 wt % in the 1$^{st}$ cycle falling to 20 wt % in 50 cycles). OSU has patented a novel wet precipitation technique to synthesize micron sized mesoporous Precipitated Calcium Carbonate (PCC) particles (Fan et al., 1998). PCC can be obtained by bubbling CO$_2$ gas in a Ca(OH)$_2$ slurry in which the surface charges on the incipient CaCO$_3$ nuclei are neutralized by the optimal addition of negatively charged polyacrylate ions (Agnihotri et al., 1999). Such a precipitate is characterized by a zero zeta potential and a maxima in surface area and pore volume. Further, its mesopore-dominated structure has shown the highest reactivity towards carbonation, sulfation and sulfidation among all available calcium-based powders (Ghosh-Dastidar et al., 1996; Chauk et al., 2000; Gupta and Fan, 2002).

PCC-CaO also is not as susceptible to loss in reactivity as LC-CaO as can be seen from FIG. 5 which depicts that PCC-CaO is able to retain a much higher reactivity even after 100 CCR cycles compared to LC-CaO or Toshiba's lithium based sorbent (Iyer et al., 2004). Calcium oxide obtained by its calcination (PCC-CaO) has achieved 68 wt % in the 1$^{st}$ cycle falling to 40 wt % in 50 cycles and to 36 wt % in 100 cycles. OSU's research expertise lies in the manipulation of sorbent structure that enhances the sorbent reactivity of the solids. To our knowledge, OSU's PCC-CaO sorbent is the by far the most reactive sorbent among many others detailed in literature as is evident from FIG. 5. Further, this sorbent uses rather inexpensive and environmentally benign chemicals (lime, water and CO$_2$ gas) as opposed to the use of lithium, zirconia, organic solvents like amines, ammonia, etc that are employed by other CO$_2$ separation processes.

PCC-CaO has also shown high reactivity for H$_2$ generation (via carbonation of the product CO$_2$) in the WGSR system. Preliminary results on H$_2$ generation in simulated fuel gas conditions indicate the effectiveness of PCC-CaO over conventional LH-CaO sorbent. PCC-CaO provides 100% CO conversion for the first 240 seconds (4 min) falling to 90% by 1000 seconds and to 85% in 1600 seconds. In comparison, LH-CaO sustains 100% conversion only in the initial few seconds, dropping to 85% in 1200 seconds (20 min).

Basis for Agglomeration

To date, OSU has been successful in synthesizing and testing micron sized calcium-based sorbents. However, upon injection in the flue/fuel gas, these micron sized sorbent particles will physically mix with fly ash particles, which are also in a similar particle size range. The use of sorbent fines over multiple cycles would be hampered, as the separation of the fines from fly ash is not feasible. Ideally, the sorbent should either be large enough so that the flue/fuel gas does not entrain it and fly ash simply passes through or the sorbent particles are substantially different from fly ash particles in size such that they can be easily separated. It is also essential that the reactor design adequately address potential ash buildup issues. For example, 100-500 micron sorbent particles can be effectively separated from fly ash in a cyclone (FIG. 6$a$). The cyclone can be designed to allow the escape of the finer ash particles. Alternatively, 5-20 mm-sized sorbents can be used in a moving bed granular filter to remove ash particles as well (FIG. 6$b$). It is therefore essential to synthesize larger agglomerates from PCC fines to ensure the viability of this reaction-based separation process in a coal fired thermal power plant.

Sorbent Agglomerate Property Requirements and Prior Work

Sorbent agglomerates ranging between 0.02-50 mm in size can be synthesized from a variety of processes, such as growth and spray agglomeration, pressure compaction and thermal sintering (Sommer, 1979; McKetta, 1995; Perry, 1984). The binding mechanisms underlying the various agglomeration processes depend predominantly on the presence or absence of solid or liquid bridges (Schubert 1979; Sommer, 1988). While many processes exist for agglomeration, we have carried out substantial amount of work on sorbent compaction and binder based agglomeration. It is essential that agglomerated calcium based sorbents retain their reactivity and strength over multiple CCR cycles. Whether these agglomerates are injected into the flue/fuel gas ducts or used in moving/packed beds, they have to endure various physical, thermal and chemical strains. Further, binders used in the agglomerate formation also have to withstand high temperatures (500-900° C.) and chemical attack by moisture and acid gases such as SO$_2$ and CO$_2$. In entrained mode, these agglomerates are subjected to impaction and attrition due to the high velocities of flue gas streams (~100 ft/s). This leads to generation of sorbent fines, which will again mix with fly ash. As illustrated in FIG. 7, another physical strain common to CaO sorbent particles is the molar volume change that accompanies its carbonation. The molar volume of CaCO$_3$ is 36.9 cm$^3$/g vs. 16.9 cm$^3$/g for CaO, which is equivalent to a molar volumetric expansion of 2.16 (Bhatia and Perlmutter, 1983).

A detailed compaction study carried out by our group revealed that PCC compacts experience a fast decay in their capture capacities over multiple CCR testing due to the onset of mass and heat transfer problems associated with larger particles as seen in FIG. 8 (Gupta et al., 2004). Additionally, the strength of these compacts was also found to deteriorate after undergoing three CCR cycles due to the large volume change in the compact induced due to alternating carbonation and calcination of the sorbent. It was therefore important to study the possibility of incorporating binders to provide greater strength to the sorbent matrix. A number of organic and inorganic binders commonly used in the ceramics industry and in the agglomeration of limestone were used in making agglomerates. Among the inorganic binders tested were hydraulic cements, clay type materials, liquid glasses and commercially available ceramic binders. The TGA results that quantify the multicyclic reactive performance of the various agglomerates are summarized in FIG. 9. The figure shows that these binder based pellets experience a monotonic decrease in capture capacity over multiple CCR cycles similar to that obtained for the pressure compacted pellets. The loading of binder in the pellet also affects the ultimate capture capacity. For example, 10 and 20 wt % alumina binder loading in PCC achieved capture capacities of 50% and 40% respectively. Further, these alumina-based agglomerates indicate a lower drop in wt % capacity over multiple CCR cycles compared to the use of lignosulfonate bound agglomerates. While lignosulfonate bound agglomerates retain the highest reactivity, they offer no appreciable agglomerate strength. In sharp contrast, the silicate bound agglomerates (sodium/potassium silicates, ceramic epoxy, Resbond 971 and ethyl silicate) are very strong but offer hardly any reactivity. All the other binder based pellets (bentonite, alumina, titania, lignosulfonate, PVC cement, PVA) either fell apart before the drop tests could be performed, or they crumbled into powders upon testing.

In view of the present disclosure or through practice of the present invention, other advantages may become apparent.

SUMMARY OF THE INVENTION

In general terms, the present invention includes a method for producing a sorbent, said method comprising the steps of: (a) obtaining an eggshell; (b) treating said eggshell with an acid so as to form an acid treated eggshell; and (c) calcining said acid treated eggshell so as to produce said sorbent.

It is preferred that the calcining is conducted under at least partial vacuum. It is also preferred that the calcining is conducted by steam.

It is preferred that the acid is acetic acid. It is even more preferred that the acid is in a concentration of from about 1M to about 10M.

DETAILED DESCRIPTION OF THE PREFERRED EMBODIMENT(S)

In accordance with the foregoing summary of the invention, the following presents a detailed description of the preferred embodiment of the invention which is presently considered to be its best mode.

Figure 1:
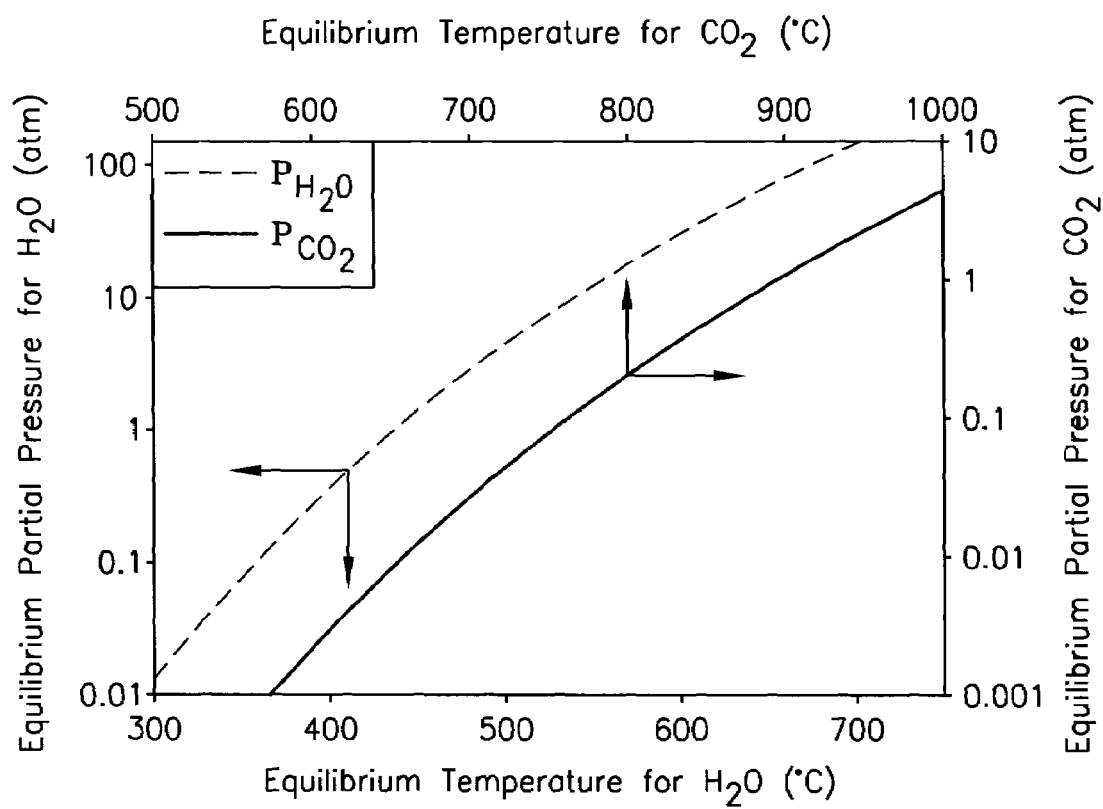
FIG. 1 illustrates the thermodynamics of the carbonation-calcination and hydration-dehydration reactions.
Figure 2:
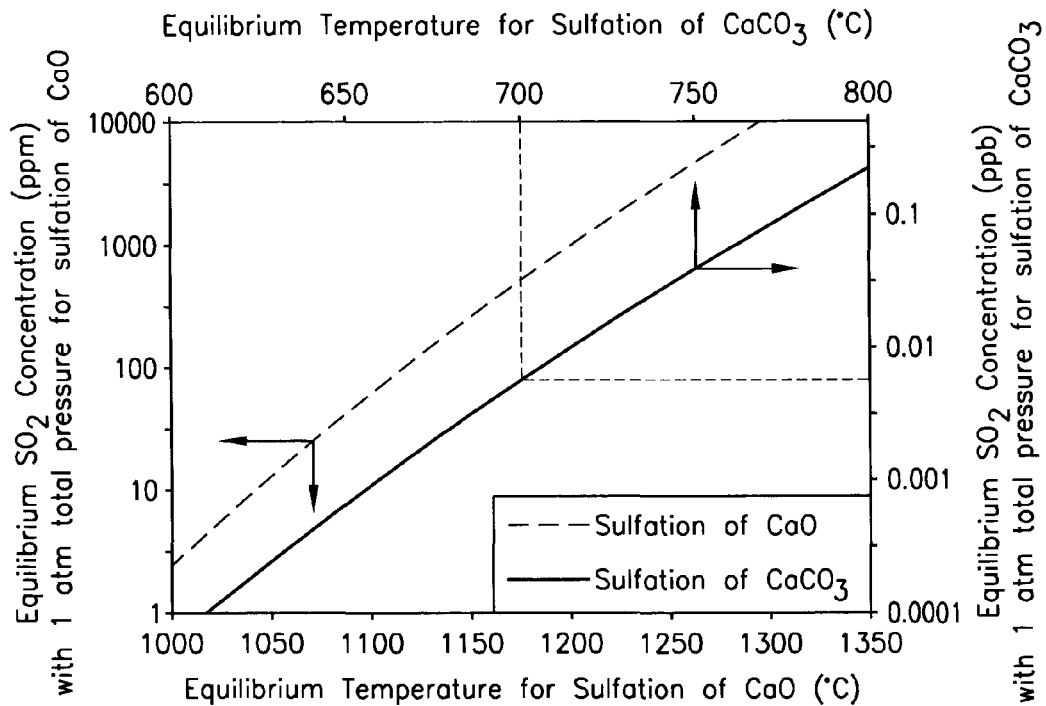
FIG. 2 illustrates the thermodynamics of the sulfonation of $CaO$ and $CaCO_3$.
Figure 3:
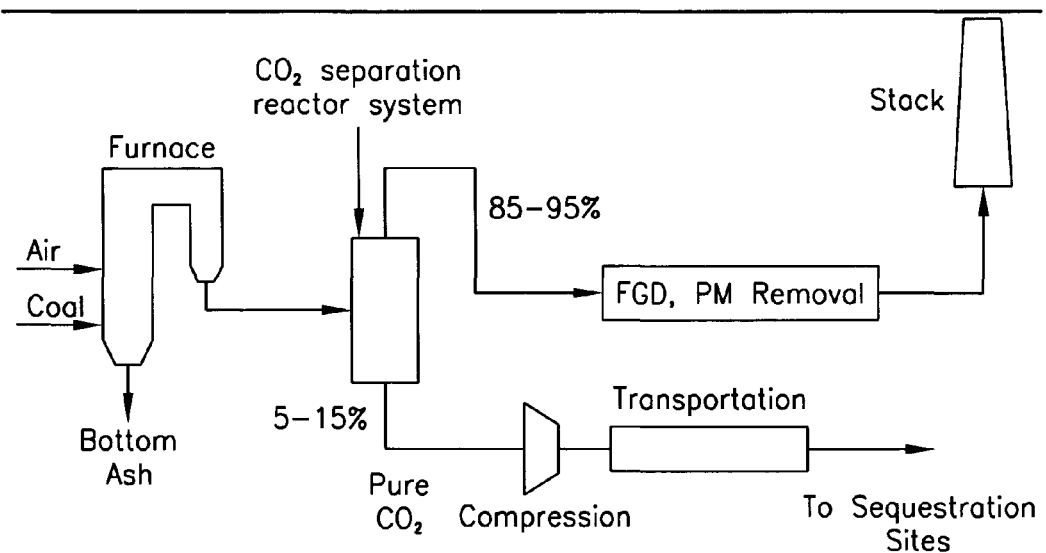
FIG. 3 is a schematic of the CaRS-$CO_2$ process.
Figure 4:
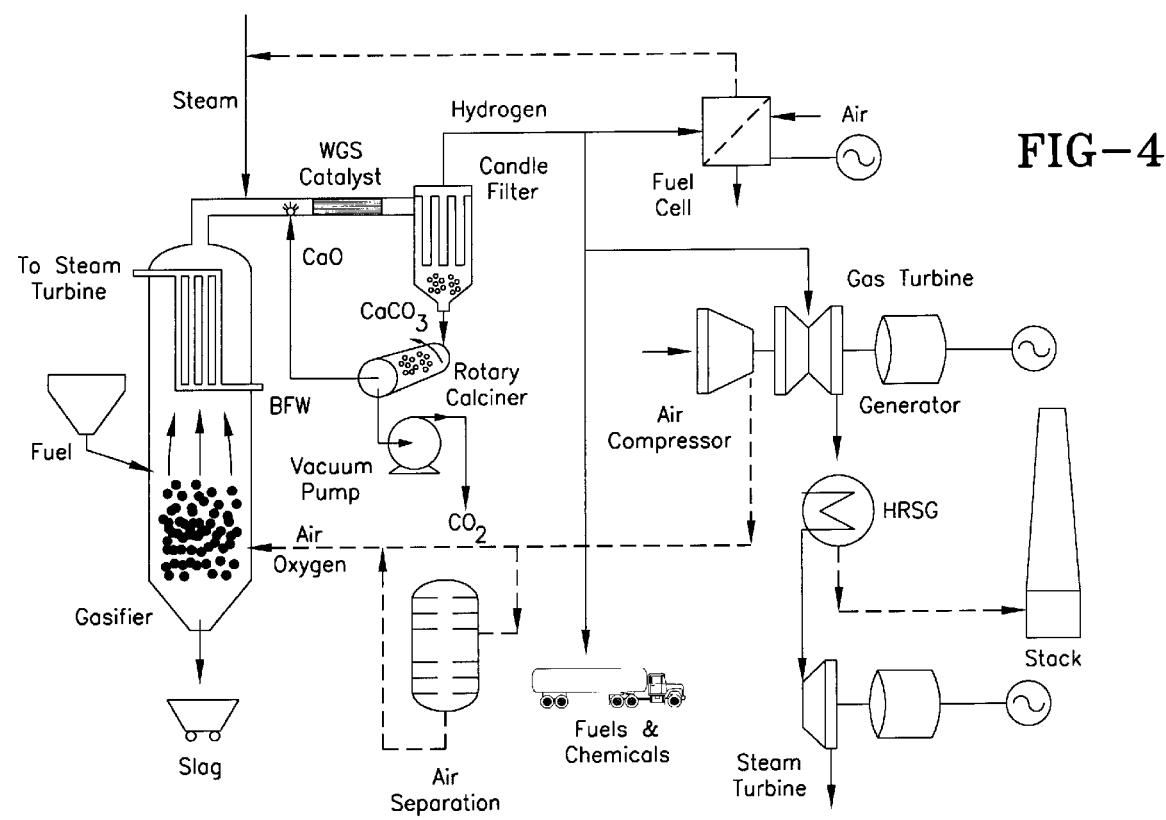
FIG. 4 illustrates the integration of reaction enhanced hydrogen production from gasifiers.
Figure 5:
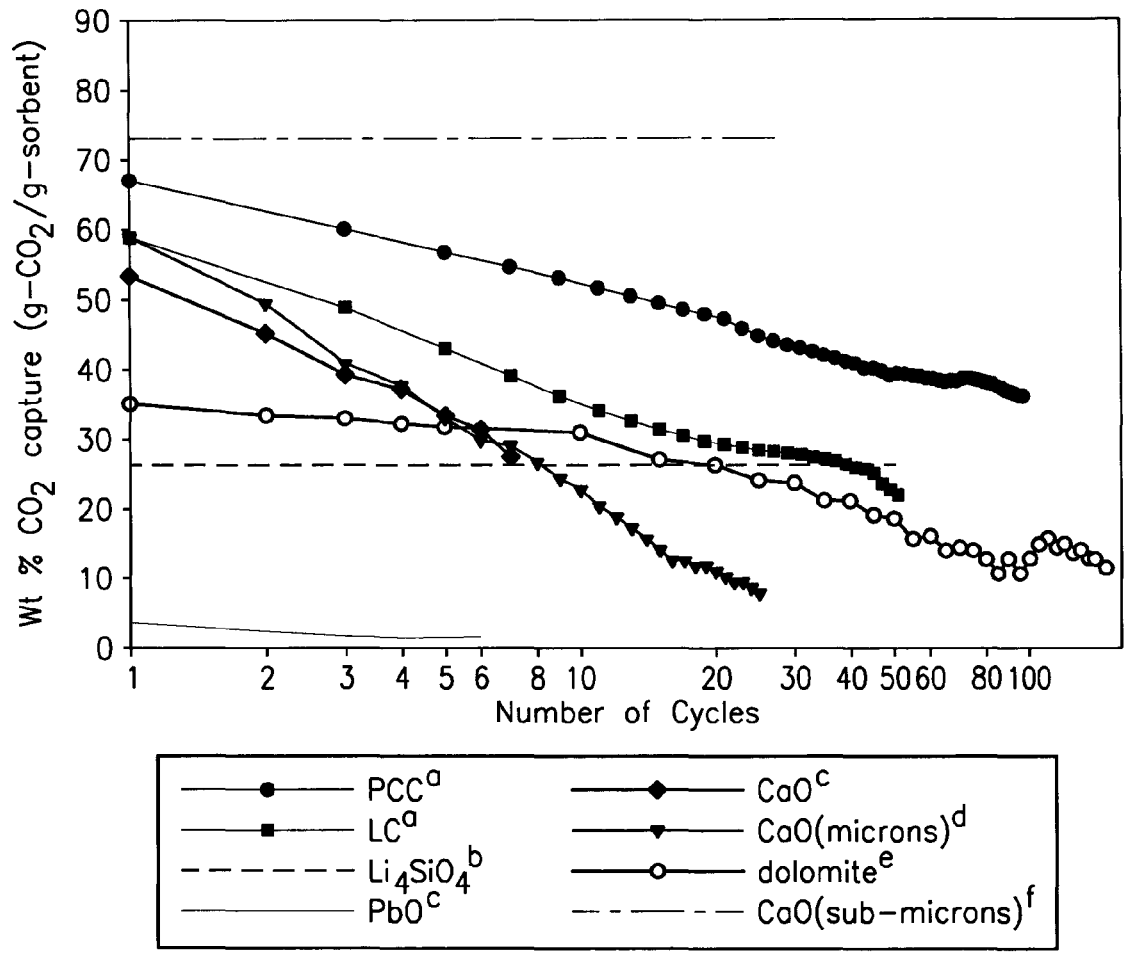
FIG. 5 is a comparison of PCC-CaO with other HTS found in literature.
Figure 6A:
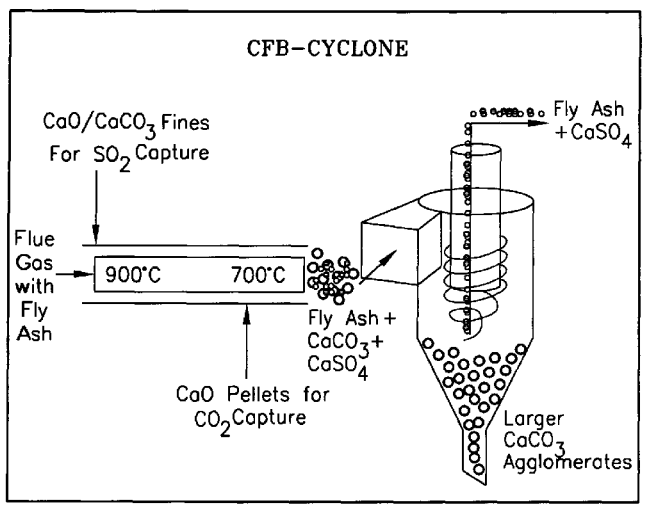
FIG. 6 illustrates (a) cyclone and (b) moving bed granular filter configurations with agglomerated sorbents.
Figure 6B:
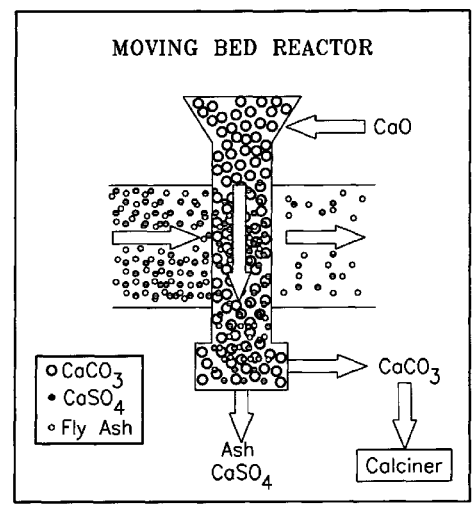
Figure 7:
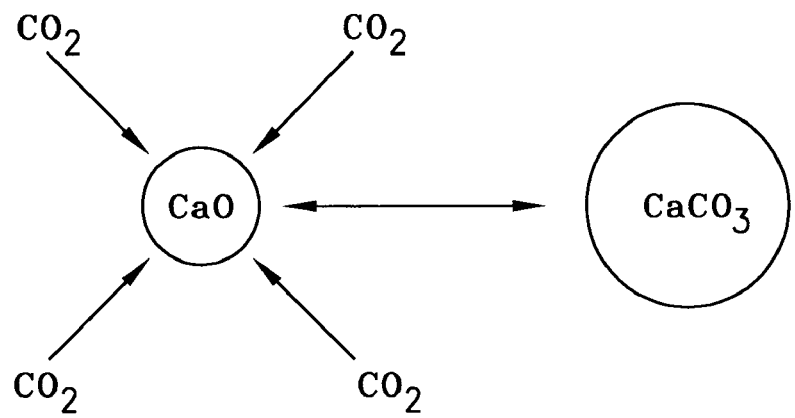
FIG. 7 shows the physical strain induced by the volumetric expansion due to carbonation in CaO particles.
Figure 8:
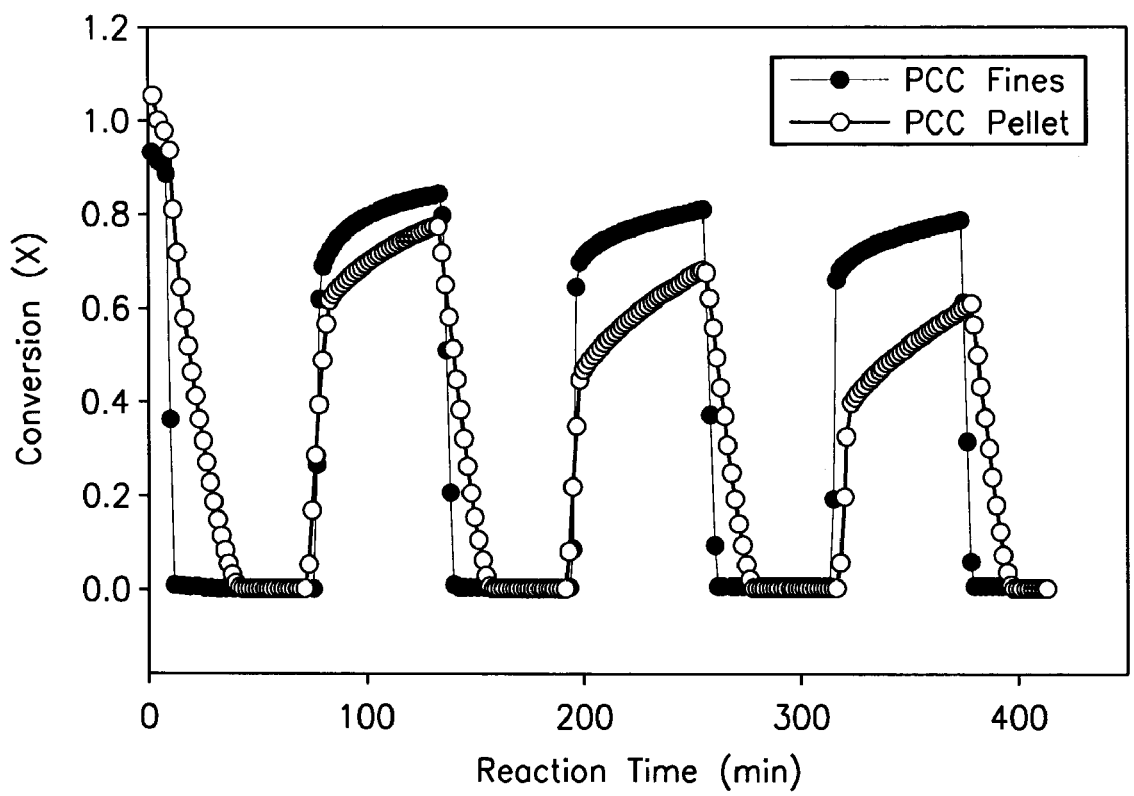
FIG. 8 shows the effect of pressure pelletization on reactivity of PCC-CaO over multiple CCR cycles at 700° C.
Figure 9:
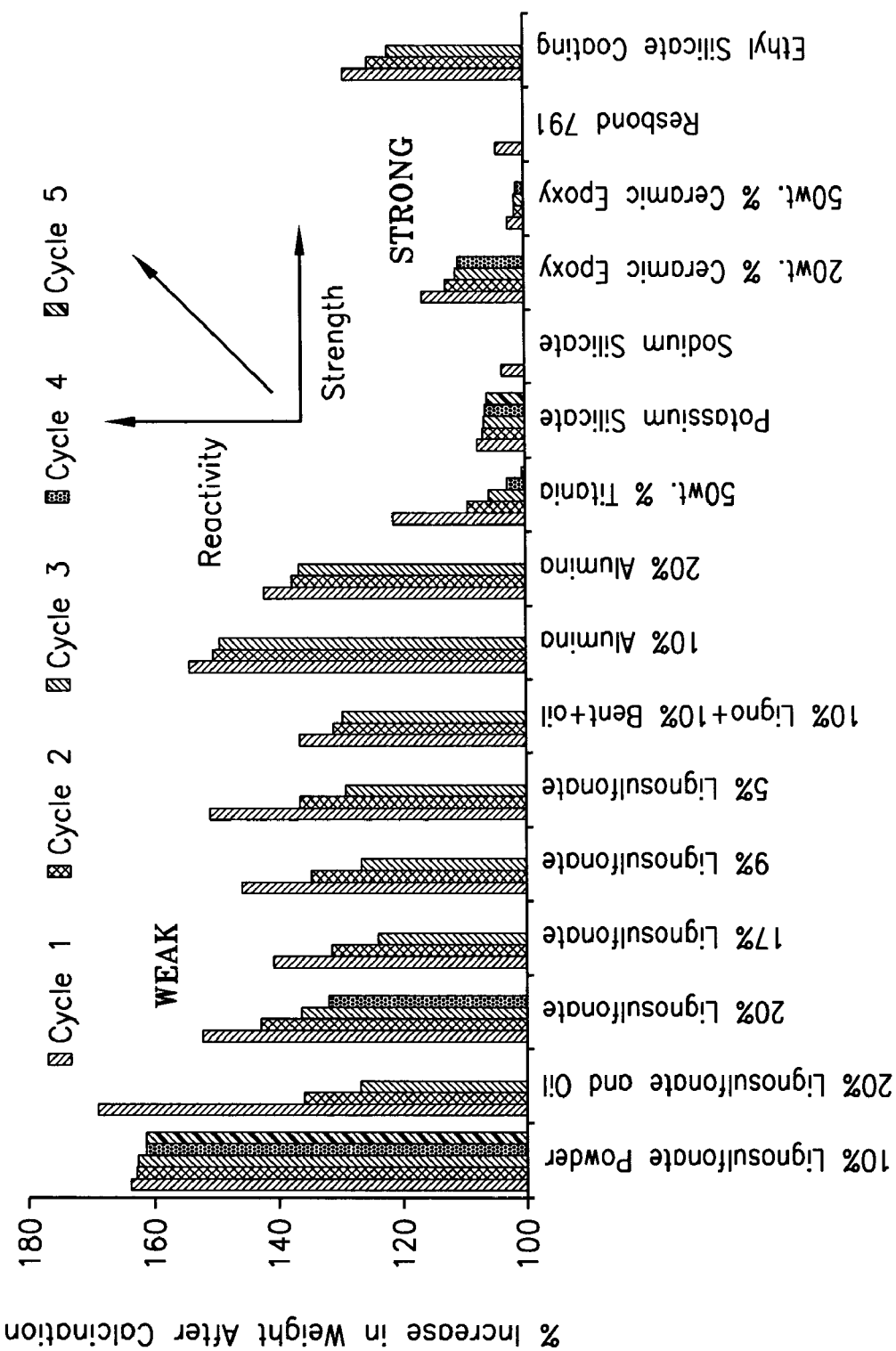
FIG. 9 compares the effect of various binders on the carbonation of PCC agglomerates at 700° C.
Figure 10:
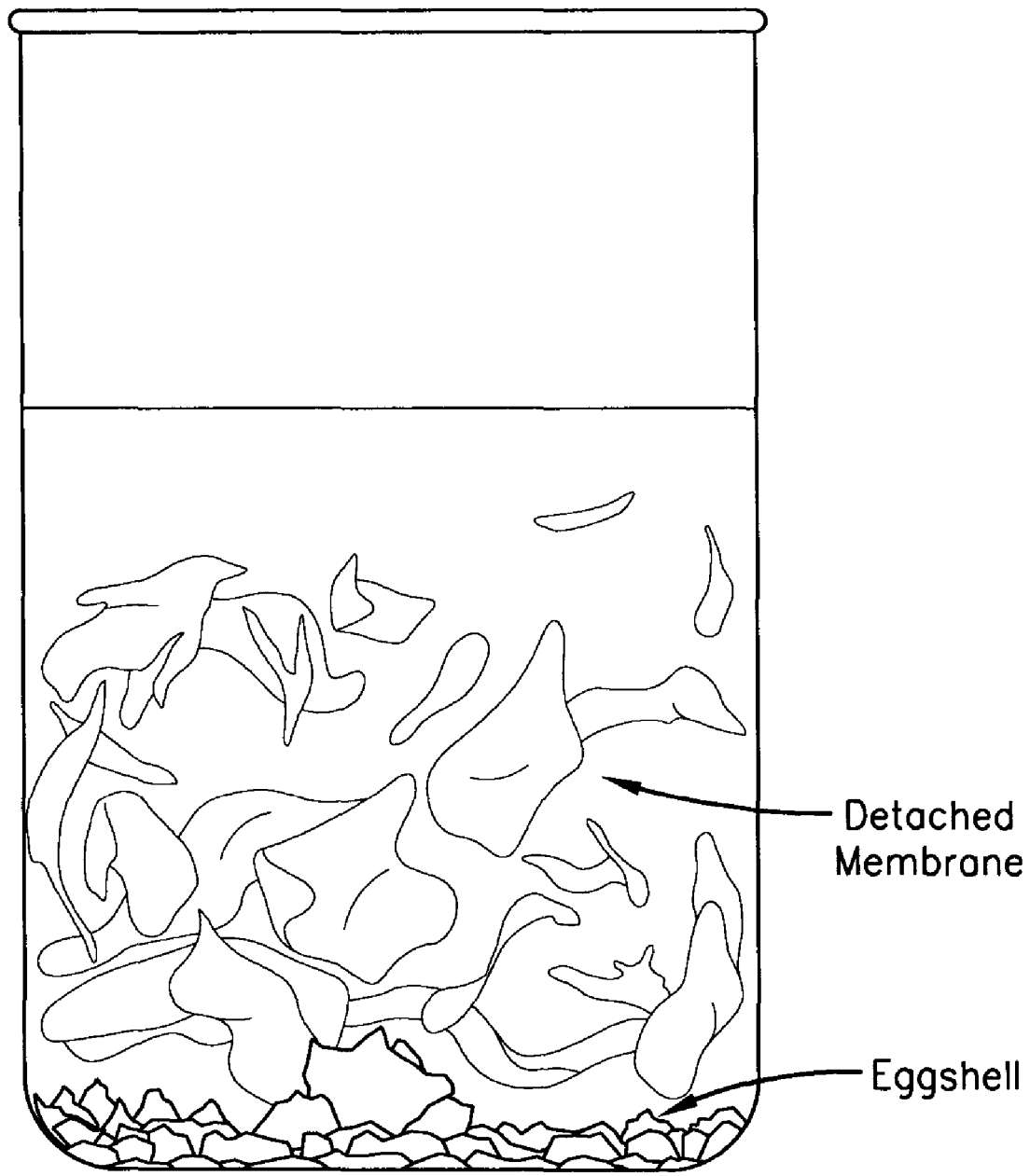
FIG. 10 shows the detachment of the organic membrane from the eggshell surface using the acetic acid treatment.

FIG. 10 illustrates the detached organic membrane floating in the acetic acid solution while the heavier calcitic eggshells settle at the bottom. This membrane, rich in collagen, can be commercially employed in several biomaterial applications.

Figure 19:
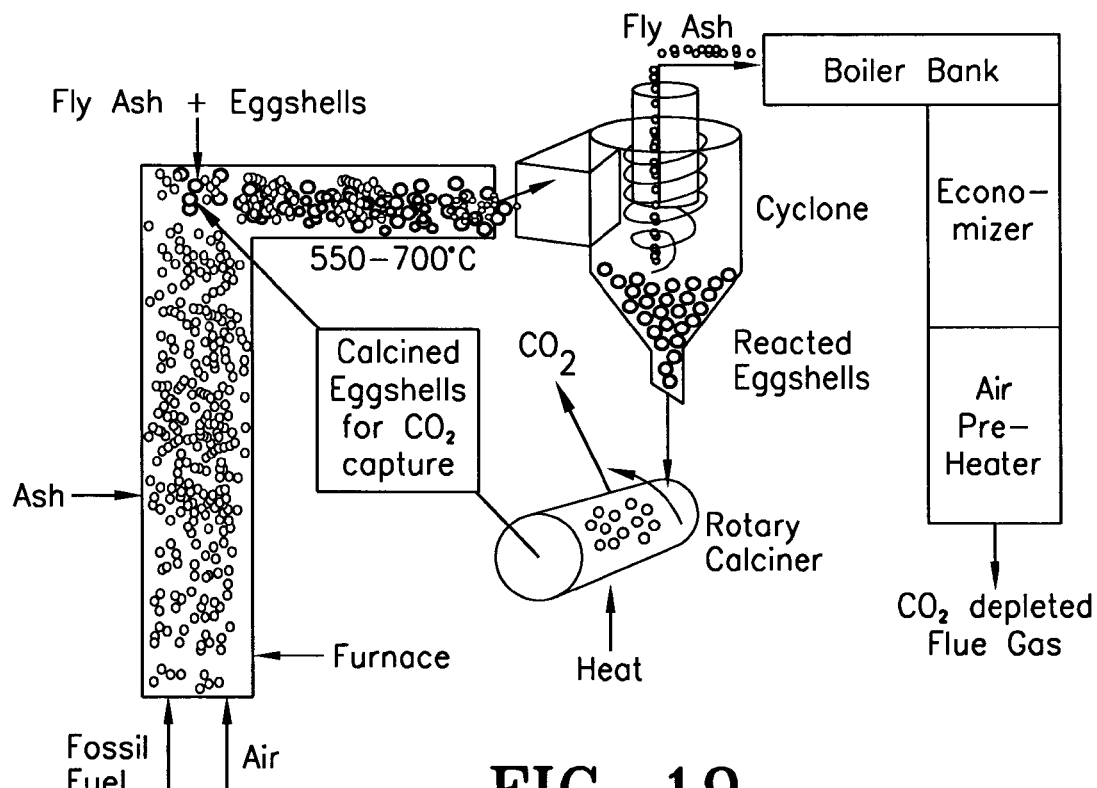
FIG. 19 Schematic of the Carbonation-Calcination Reaction (CCR) based $CO_2$ Separation Process being retrofitted in a Pulverized Coal Combustion Facility.

However, reactive agglomerates, with a significantly different PSD compared to fly-ash, enable the use of this CCR process as illustrated in FIG. 19.

Figure 11:
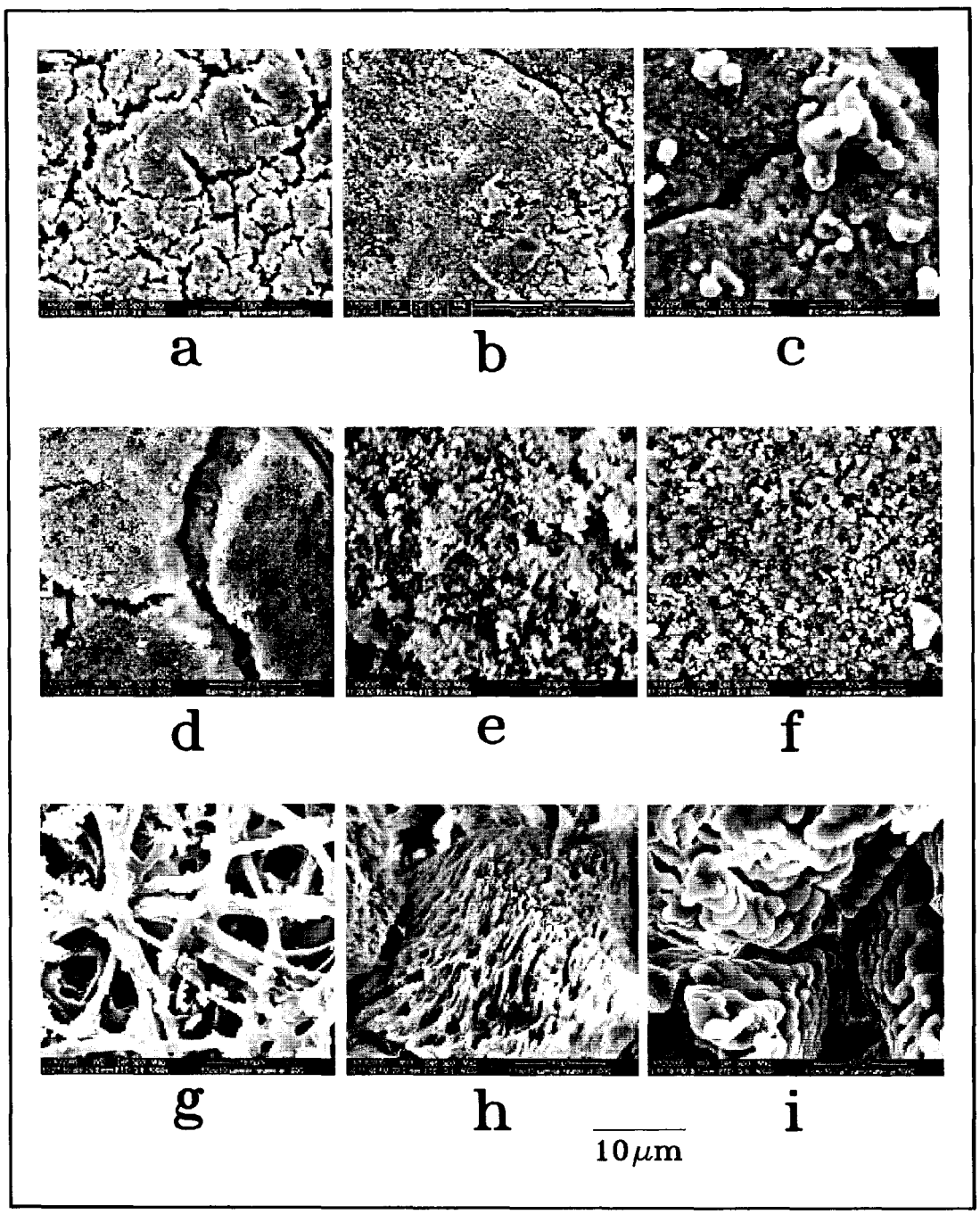
FIG. 11 Scanning electron micrographs (8000× magnification) of various tailored eggshell sorbents, after calcination and after carbonation at 700° C. a, ES, after drying at 400° C. b, ES-CaO. c, ES-CaO after carbonation. d, hydrated eggshell, ESH. e, ESH-CaO. f, ESH-CaO after carbonation g, ESAc. h, ESAc—CaO i, ESAc—CaO after carbonation.

FIG. 11 illustrates the scanning electron micrographs of various ES sorbents, their calcines and reacted carbonates. The ES surface (11a) consists of overlapping "plates" interspersed with 0.5-2 micron sized cracks. Calcination increases the porosity (11b) as is evident from the surface morphology, which consists of spherical CaO grains with similar sized 250-500 nm pores. The carbonation of ES-CaO (11c) leads to the formation of a higher molar volume product ($CaCO_3$) filling up the pores. The smooth and continuous product layer significantly reduces the number of cracks.

ESH (11d) surface has a large number of deeper cracks, reaching up to 5 microns in width, which allows a better access of gases throughout the eggshell depth. Unlike ES-CaO (11b), ESH-CaO (11e) has a relatively higher pore to grain ratio. These structural features allow easier expansion and contraction of the sorbent over multiple CCR steps, which help in enhancing the reactivity over the parent ES sorbent. This is corroborated by extensive residual pore structure in ESH-$CaCO_3$ (11f), which is the unlike the continuous carbonated layer in ES-$CaCO_3$ (11c). Acetic acid treated sorbent (ESAc) leaves behind a fibrous structure (11g) consisting of 2 micron fibers interlaced to provide 5-10 micron holes. The mineral surface is not very visible. While the majority of the membrane gets detached, this fibrous structure could indicate the residual organic membrane itself. In sharp contrast, the calcined sorbent, ESAc—CaO (11h), is characterized by 50 micron sized clusters, which in turn consist of 250-500 nm thick filaments that protrude about 2-5 micron from the surface. This structure allows for the expansion and contraction involved with CCR more effectively. The maintenance of pores between the tubular structure permits the access of reacting $CO_2$ throughout the pores.

The surface area, pore volume, and pore size distribution were measured by Brunauer-Emmett-Teller (BET) analysis at −196° C. using $N_2$ adsorbent by a NOVA 2200 analyzer (Quantachrome Co., Boynton Beach, Fla.). The micrograph images were obtained using Quanta Scanning Electron Microscope (Model 200, FEI Company). The reactivity testing of the calcium-based sorbents was carried out in a Thermogravimetric Analyzer (TGA) procured from PerkinElmer Corp. (Wellesley, Mass.; model # TGA-7). The gas flow rates were accurately maintained using a set of variable-area flowmeters obtained from Cole Parmer Instruments Co. (Vernon Hills, Ill.). An automated multi-position valve (VICI Corporation, Model # EMTMA-CE) actuated by a programmable electronic timer (VICI corporation, Model # DVSP4) was used to switch between pure nitrogen stream and the reaction gas mixture at operator determined time intervals in order to effect the cyclical calcination and carbonation reactions of the sorbent. All the carbonation experiments were conducted at 700° C. in a 10% $CO_2$ stream (diluted in $N_2$) while the calcinations were conducted at 700° C. in pure $N_2$.

Naturally occurring limestone ($CaCO_3$) was obtained from the Linwood Mining and Minerals Company (Davenport, Iowa; Linwood Carbonate, LC). $N_2$ and $CO_2$, obtained from Praxair, Inc were 99.999% and 99.9% pure, respectively. Precipitated Calcium Carbonate (PCC) was synthesized using $Ca(OH)_2$ obtained from Fischer Scientific (Pittsburgh, Pa.) and an anionic surfactant, N40V, obtained from Ciba Specialty Chemicals (Basel, Switzerland). The PCC and LC pellets were synthesized by compaction in a MTS 810 Material Test System. Used chicken eggshells were obtained from household kitchen wastes. For certain experiments, the membranes from wet eggshells were manually peeled before drying them. The eggshells were cleaned with distilled water, dried in flowing air at 100° C., and stored at room temperatures. The calcined eggshell samples (ES-CaO) were prepared by calcining the membrane free eggshell chips at 700° C. for 2 hours in flowing air. The samples were subsequently cooled in flowing $N_2$ to prevent any carbonation from atmospheric $CO_2$. The hydrated eggshell samples (ESH) were prepared by the drop-wise addition of distilled water to ES-CaO chips at room temperature until saturation. This hydration method is similar to the incipient-wetness impregnation method used to prepare catalysts. They were then dried in flowing air at 100° C. These ESH samples were subsequently tested for complete hydration by observing the weight loss in the TGA. The ESAc samples were prepared by treating eggshell chips with membranes. These chips were treated by stirring them in a beaker with acetic acid of varying concentrations, ranging from 1M to 10 M. The ESAc samples prepared using different acid concentrations were washed after decanting the solution containing the membrane, and then dried in flowing air at 100° C. The calcined samples of ESH and ESAc, called as ESH-CaO and ESAc—CaO respectively, were prepared using the same protocols as those for synthesizing ES-CaO. The reacted samples of ES-CaO, ESH-CaO and ESAc—CaO were prepared by carbonating each of them in a 100% $CO_2$ stream for 1 hour at 700° C.

Introduction to Eggshells:

One of the biggest challenges facing the Food Manufacturing Coalition in this country is the disposal of waste eggshells as it ranks high in their list of "Need Statement." Eggs are used for a variety of products ranging from fast foods, cakes, salad dressings, mayonnaise, noodles and even shampoos. These result in massive amounts of eggshell waste that currently require expensive disposal costs. Typical egg processing units like Daybreak Foods of Minnesota, consume as much as 3 million eggs a day, which results in eggshell waste of about 18 tons/day (Vincent Corp, 2004). The average per capita egg consumption in the U.S. is about 256 (USDA, 2003). This results in annual eggshell wastes of over 400,000 tons from various egg processors and hatcheries with an average 5.5 g of eggshell waste from each egg. Even many countries in Europe are equally challenged by this problem. Current disposal options include the most basic landfill, land applications like those of soil mixing and organic farming and recycling as poultry diets. Of these, landfill is the easiest option as other alternatives involve significant processing costs. Even in case of landfill, the eggshell wastes are required to be treated as organic wastes in many states. In the U.S., landfill costs can be anywhere from $20-70/ton depending on the location. In countries like United Kingdom, where land comes at a premium, these values can be between $50-90/ton due to the imposition of the addition landfill tax (Giffins and Drakley, 2002). Hence, there has been a significant emphasis on research and inexpensive technologies for value added products from waste eggshells.

A typical chicken eggshell consists of three layers: cuticle, the shell stratum and two inner shell membranes (Davis and Reeves, 2004). The cuticle is a thin membrane that covers the eggshell and is about 10 microns thick. It consists of proteins, carbohydrates and lipids and it protects the egg from moisture and microorganisms. The shell stratum, which is referred to typically as the "eggshell" actually comprises of about 95% inorganic substances (typically calcium carbonate), 3.3% protein and 1.6% moisture. The shell stratum consists of several pore canals that allow air and moisture to pass through it, which is essential for survival of the chicken. This layer comprises of 3 additional sub-layers: a vertical crystal layer, a palisade (spongy) layer and a mamillary knob layer which are about 5, 200 and 110 micron thick respectively. The palisade layer is porous and it consists of $CaCO_3$ crystals, which combine with collagen to form a spongy matrix. The mamillary knob layer serves to harden the shell.

The typical dry eggshell is an excellent bioceramic composite comprising typically 95% calcite ($CaCO_3$) crystals, 0.3% magnesium, 0.3% phosphorus, and traces of strontium, sodium, potassium, zinc, manganese, iron, copper and other metals. The organic material in the eggshell has excellent calcium binding properties and it eventually leads to a strong shell by self-organizing the calcite crystals in a peculiar orientation during the 20 hour chicken eggshell formation process.

Discussion

Figure 12:
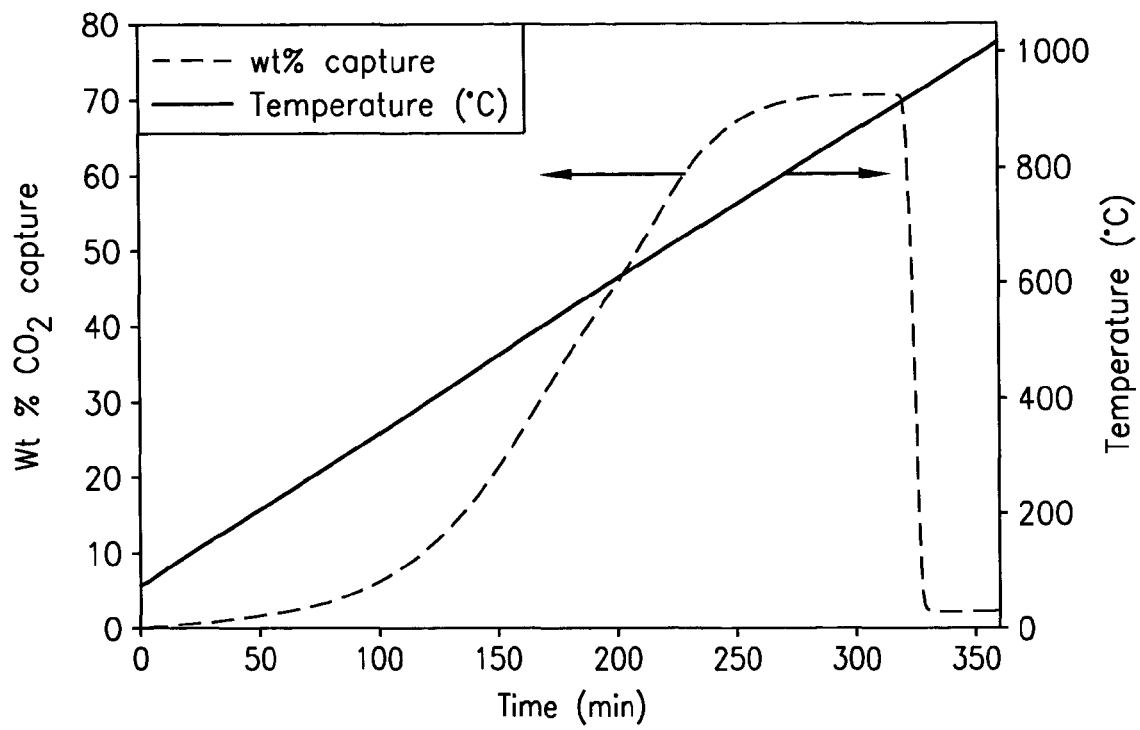
FIG. 12 is the temperature scanning profile for calcined eggshell sorbent in a pure $CO_2$ stream at 1 atm.

Clean and dried Eggshell (ES) sample, free from its organic membrane, was calcined in a flowing $N_2$ stream with a slow temperature ramp in a Thermogravimetric analyzer (TGA). The onset of ES calcination was found to occur at around 650-700° C. The calcined ES sample was then subjected to carbonation in a pure $CO_2$ stream in the TGA with a temperature ramp. The $CO_2$ capture started occurring at low temperatures (~50° C.) and continued up to 900° C. beyond which it started to calcine rapidly. The wt % $CO_2$ capture capacity (defined as grams of $CO_2$ captured per gram of the sorbent) was observed to be as high as 70 wt %. The details are shown in FIG. 12.

Figure 13:
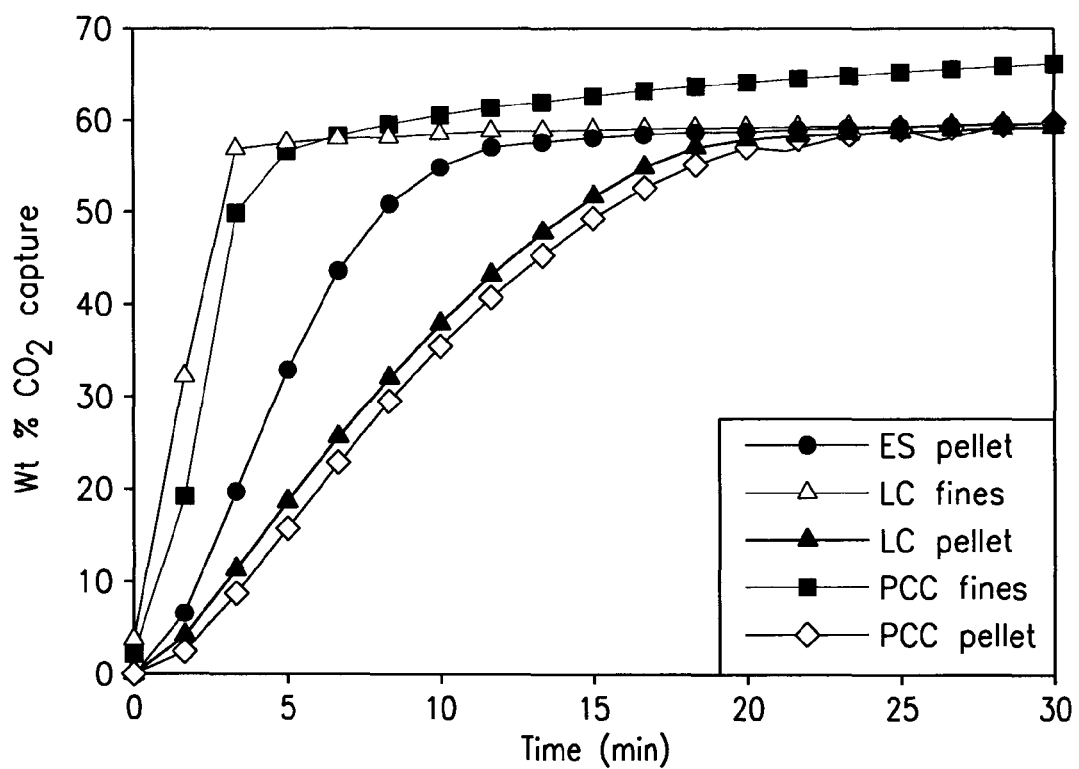
FIG. 13 is a comparison of eggshell (ES) with other Ca-based sorbents for $CO_2$ capture (10% $CO_2$, 700° C.).

FIG. 13 shows the comparisons of the carbonation of ES pellet with other Ca-based sorbents for $CO_2$ capture in a 10% $CO_2$ in $N_2$ stream at 700° C. Pellets of PCC and LC as well as LC fines show similar capacity as that of ES, eventually tending to about 60 wt % capture capacity. However, the morphologically engineered PCC fines tend to show a higher capture capacity due to the reasons mentioned earlier. Amongst the pellets, ES pellet demonstrates better kinetics than the other two, which can be ascribed to improved mass transfer characteristics. This is evident from FIG. 13.

Figure 14:
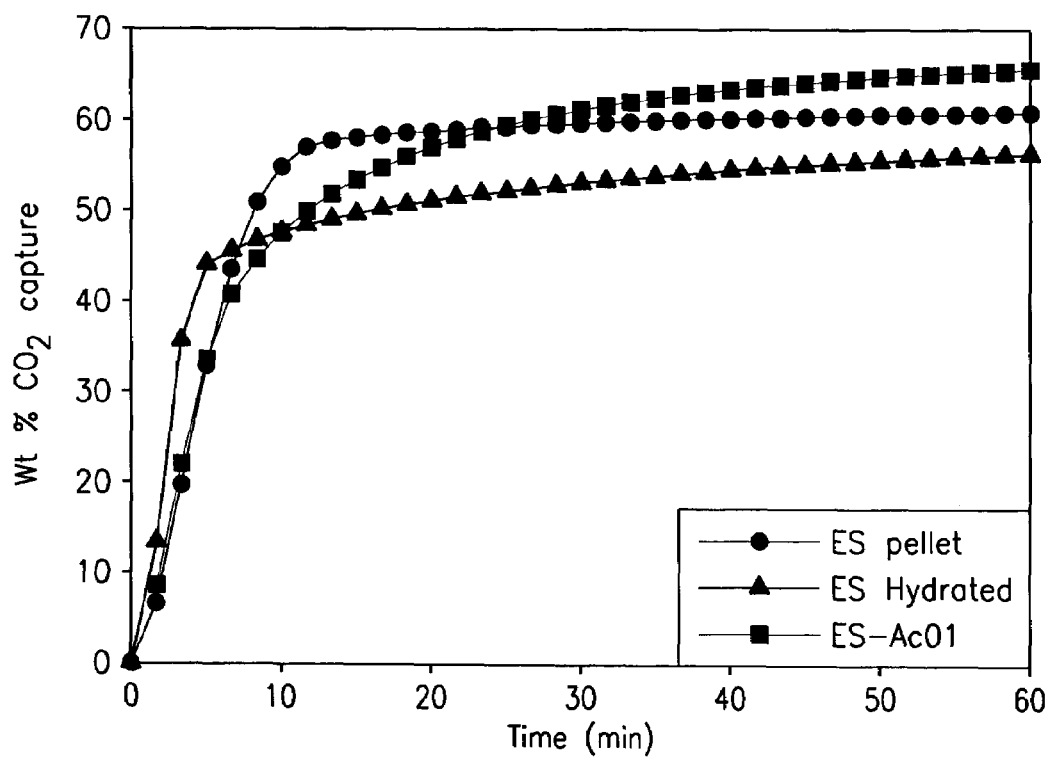
FIG. 14 is a comparison of various tailored eggshell (ES) sorbents for $CO_2$ capture (10% $CO_2$, 700° C., 1 atm).
Figure 15:
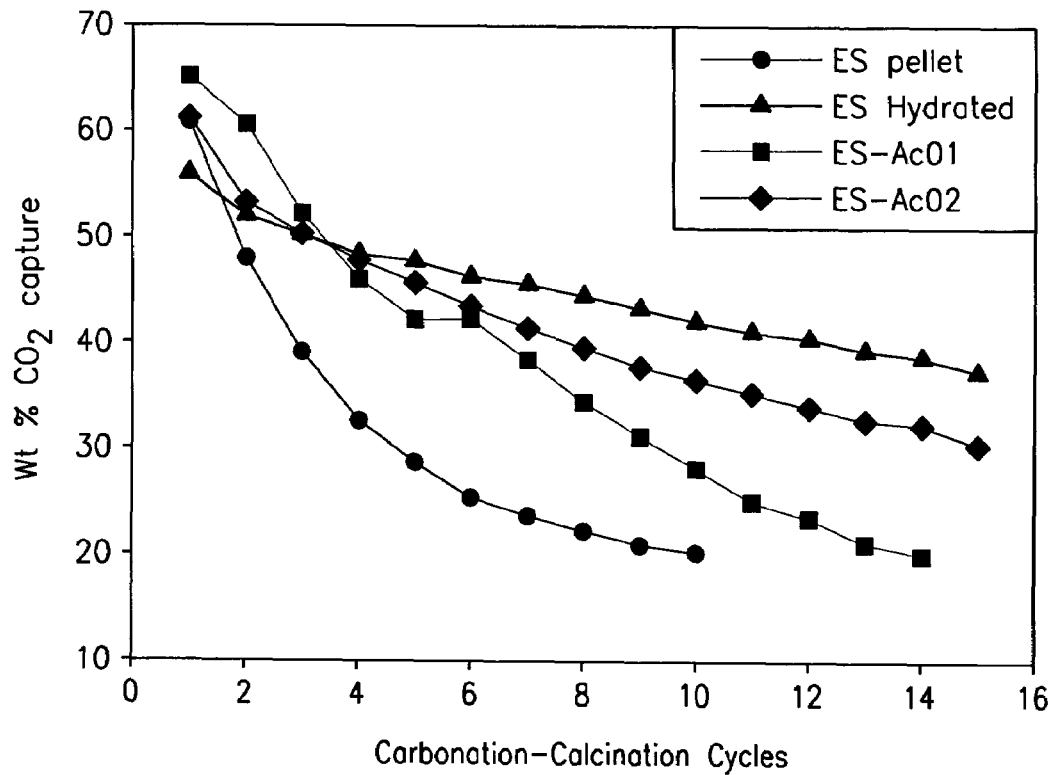
FIG. 15 demonstrates the $CO_2$ capture capacity of various tailored Eggshell (ES) sorbents over multiple carbonation-calcination cycles in a TGA (carbonation: 10% $CO_2$, 700° C., 60 min).

Clean and dried ES has a surface area (SA) of 2.5 $m^2/g$ and a pore volume (PV) of 0.005 cc/g with majority of the pores around 4 nm. Some preliminary investigations were performed in order to modify the morphological characteristics of ES. In one scheme, the eggshells were calcined in $N_2$ at 700° C. and then hydrated in excess water. The hydrated ES sample shows substantial increase in SA (6.5 m²/g) and PV (0.028 cc/g) over the parent ES. In another scheme, the eggshells were treated with different concentrations of acetic acid (AcOH) solutions. U.S. Pat. Nos. 3,194,732; 5,053,238, and 5,939,118 are each incorporated by reference herein for their respective teachings regarding the removal of the inner shell membranes. The resulting hydrated ES pellets and the acid treated ES samples (ES-AcOH) were then subjected to carbonation reaction. The comparison of the reactivity of ES pellet with hydrated sample (ES-hydrated) and acid treated samples (ES-Ac01 and ES-Ac02, modified with different acid concentrations) is shown in FIG. 14. This figure clearly shows an improvement in capture capacity from ~60% for ES to about 66% for ES-Ac01 sample. The hydrated ES shows a slightly lower capacity (~56%) in the first cycle. However, the samples were subsequently calcined in $N_2$ and then recarbonated in the subsequent cycle. This was continued over multiple CCR cycles. It is evident from FIG. 15 that the samples lose reactivity with progressive CCR cycles. However, the original ES pellet shows the largest drop in reactivity with ~60% capture in $1^{st}$ cycle to ~20% capture capacity in the $10^{th}$ cycle. On the other hand the modified ES sorbents show better performance over multiple cycles. Albeit ES-hydrated sample showed a lower reactivity in the $1^{st}$ cycle (56%) it shows better capture capacity of ~37% after 15 cycles. Similarly, ES-Ac02 sample also shows improved performance with about 30.3% capture capacity after 15 cycles.

Figure 16:
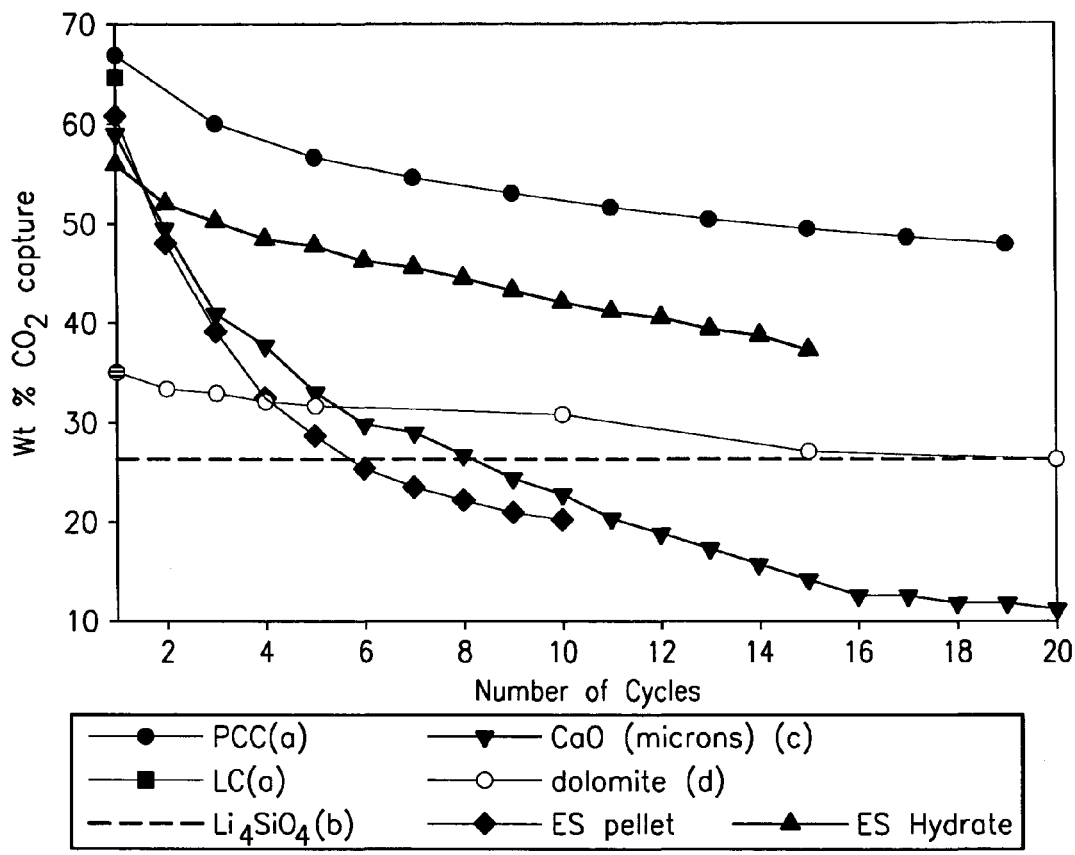
FIG. 16 provides a comparison of $CO_2$ capture capacity of proposed eggshell (ES) sorbents with other high temperature sorbents over multiple carbonation-calcination cycles [(a) Iyer et al., 2004; (b) Nakagawa, 2003; (c) Barker, 1974; (d) Ortiz and Harrison, 2001].

FIG. 16 shows the comparison of multicyclic performance of ES sorbents with other high temperature sorbents reported in the literature. As mentioned earlier, PCC-CaO fines show the highest capacity while the ES pellets show a poor performance over a 10-cycle period. However, the hydrated ES pellets show a considerably improved performance as compared to ES, LC, CaO fines, dolomite and the proprietary $Li_4SiO_4$ sorbent from Toshiba Corp., Japan. In addition, the improved performance of the hydrated ES sorbent is encouraging and this can ensure sustained performance over several cycles. This is because the sorbent can be completely regenerated by simple hydration after some CCR cycles and it should revert back to its initial $1^{st}$ cycle capture capacity of ~56%. Further work is required to understand and improve the performance of the tailored ES sorbents.

Figure 17:
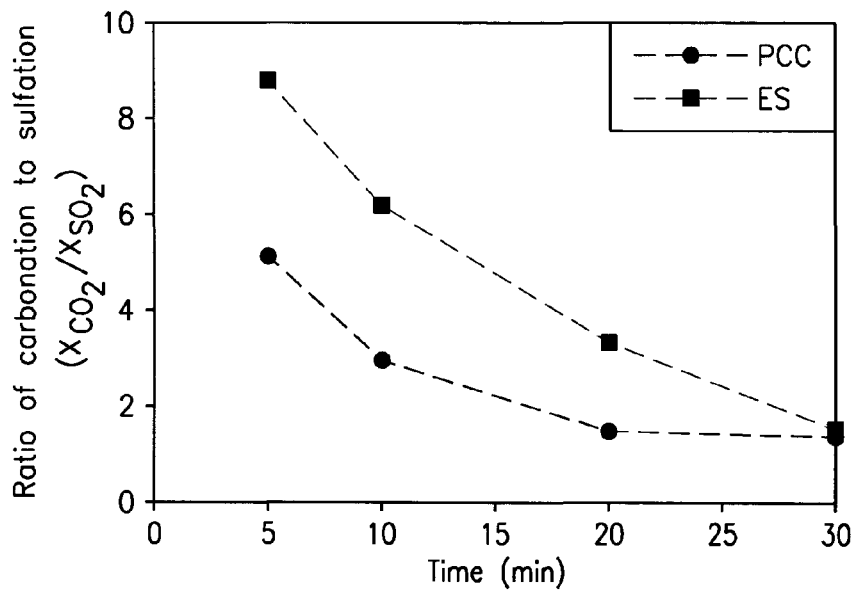
FIG. 17 shows the effect of residence time on carbonation to sulfonation ratio under simultaneous carbonation-sulfonation experiments of PCC fines and Eggshell (10% $CO_2$, 3000 ppm $SO_2$, 4% $O_2$, 700° C.).

As mentioned earlier, the effect of $SO_2$ on the carbonation of ES related sorbents was carried out in a TGA. In this study, the optimization of the ratio (R) of extent of carbonation ($X_{CO2}$) to sulfation ($X_{SO2}$) plays a significant role in improving the $CO_2$ capture capacity of the sorbent over successive cycles where temperature, time and concentration play a key role. We have published the details outlining this concept elsewhere (Iyer et al., 2004). Preliminary investigation of combined carbonation and sulfation were carried out in a TGA at 700° C. with the gas mixture comprising of 10% $CO_2$, 3000 ppm $SO_2$, 4% $O_2$ in $N_2$. The extents of both the reaction were observed for PCC fines and ES sorbents for varying residence times. The ratio R (=$X_{CO2}/X_{SO2}$) comparison of ES and PCC-CaO is depicted in FIG. 17. It is evident that ratio obtained by the ES pellets dominate over that obtained by the PCC fines over the residence time range investigated. There is a noticeable difference in the ratios at lower residence times (5-20 min) and it eventually merges around 30 min. This might be due to the differences in the pore structure of ES and PCC. PCC has a predominantly mesoporous structure that has favored high conversions for sulfation and carbonation reactions (Wei et al., 1997; Gupta and Fan, 2002). However, eggshells have a microporous structure that seems to favor the reaction with smaller $CO_2$ molecules as opposed to the larger $SO_2$ molecules. Thus, eggshells could possibly entail a lower detrimental effect of $SO_2$ over more CCR cycles compared to PCC.

The main economic bottleneck for deploying carbon management practices on existing fossil fuel (coal and gas) combustion and gasification units lies in the separation of $CO_2$ from the flue/fuel gas. Many reports (Herzog et al., 1997) suggest that the cost of $CO_2$ separation could be as high as 75-85% of the entire $CO_2$ management cost. Combustion of fossil fuels leads to vast $CO_2$ emissions into the atmosphere. Hence, an inexpensive process is required for $CO_2$ separation from flue gas before it can be compressed, cooled, liquefied, transported and ultimately sequestered. The use of high temperature sorbents such as CaO offers significant advantages over existing $CO_2$ separation techniques such as (adsorption, absorption, membrane separation, etc.) due to its high sorption capacity (5-10 times higher than that of adsorbents/absorbents) under flue gas temperature (800-150° C.) and pressure (sub atmospheric) and by reducing the capital and operating costs as well as the parasitic energy penalty associated with $CO_2$ separation.

Table 1 below represents a quantitative comparison of this process with the commercially available amine based (MEA) process for $CO_2$ separation from flue gas streams. It can be inferred from Table 1 that the realization of this technology to retrofit into the existing power plants would result in significant energy, and hence cost savings.

TABLE 1

Comparison of this proposed CaRS-$CO_2$ process with the commercial amine based (MEA) $CO_2$ capture technology. ([1]Rao and Rubin, 2002)

| Parameters | Unit | MEA[1] | Calcium |
|---|---|---|---|
| Sorbent/solvent cost | $/ton | 1250 | 60-120 |
| Active Concentration | wt % | 15-50 | 100 |
| $CO_2$ capacity | wt % | 16 | 40-70 |
| $SO_2$ management | ppm | <10 | 100-300 |
| Reaction/Regeneration Temp. | ° C. | 38/149 | 700/700-800 |
| Pressure Drop | Inch. of water column | 136 | 2 to 20 |
| Regeneration energy | kWh/ton $CO_2$ | 147 | 84 |
| $CO_2$ compression energy | kWh/ton $CO_2$ | 95-135 | 95-135 |

To date, optimized high reactivity 1-10 micron sized particles that provide high reactivity (about 68 wt % capture) have been synthesized. However, upon injection in flue gas, these fine particles would get mixed with concomitant fly-ash particles. It would be difficult to separate these sorbent fines from ash mixture, followed by calcination and reinjection into the flue gas. It is thus imperative to synthesize agglomerates from these fine particles that are sufficiently different in size from the ash particles. Reactivity of compacted sorbent fines shows substantial loss in activity. So far, extensive study in agglomerating lime based sorbent fines with binders has resulted either in reactive, but weak pellets or unreactive, but strong pellets.

This invention describes a comprehensive $CO_2$ separation process using chicken eggshell based sorbents, thereby solving another environmental problem. Eggshells, which predominately consist of CaCO3, have high strength and are stronger than pelletized and agglomerated calcium-based sorbent fines currently under development at OSU. Hence, this invention aims at utilizing waste eggshells that are naturally strong calcium agglomerates with promising reactivity towards $CO_2$ capture (~60 wt % capture). This technology quantifies the performance and development of chemical/ physical activation processes to manipulate the pore structure to develop a mesoporous high reactivity agglomerated eggshell structure that will enhance the ultimate $CO_2$ sorption capacity of Eggshells towards carbonation.

Figure 18A:
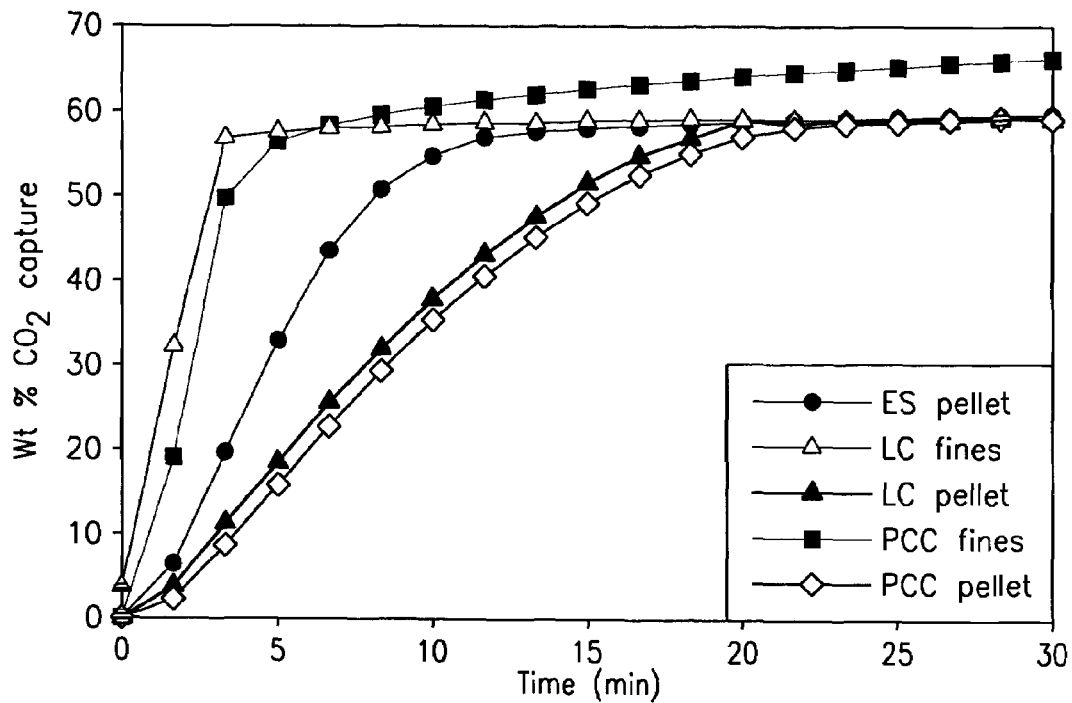
FIG. 18 provides (a) a comparison of the reactivity of Eggshell (ES) with other calcium sorbents towards carbonation at 700° C. and 10% $CO_2$; (b) a comparison of ES sorbents with other high temperature sorbents reported for $CO_2$ capture over multiple Carbonation-Calcination cycles in a TGA. (carbonation: 10% $CO_2$, 700° C., 60 min; calcination: pure $N_2$, 60 min). (a) ref. 26, (b) ref. 27, (c) ref. 19, (d) current work; and (c) the effect of intermediate hydration on reactivity of eggshells over multiple sets of Carbonation-Calcination cycles in a TGA (carbonation: 10% $CO_2$, 700° C., 60 min; calcination: pure $N_2$, 60 min)

The ES-CaO sample, when subjected to carbonation in a 100% $CO_2$ stream in the TGA, attains a 70 wt % $CO_2$ capture capacity (defined as grams of $CO_2$ captured per 100 grams of the sorbent). FIG. 18(a) compares the reactivity of calcium based fines and pellets in 10% $CO_2$ at 700° C. In accordance with well-known fundamentals of heterogeneous reactions involving porous solids, it can be corroborated from FIG. 18(a) that 10-50 micron sized LC and PCC fines show faster kinetics than the corresponding 1.5 mm thick pellet. However, these pellets suffer from a remarkable drop in reactivity over multiple cycles. While synthesized pellets, thinner than 1.5 mm, exhibit poor strength, 300 microns thick eggshell chips demonstrate significantly higher reactivity, while maintaining adequate strength. PCC and LC pellets as well as LC fines show similar capacities to those of ES chips, eventually reaching 60 wt % capture capacity. However, the ES pellet demonstrates better kinetics than the other two, which can be ascribed to improved mass transfer characteristics due to the thinner diffusional length.

Figure 18B:
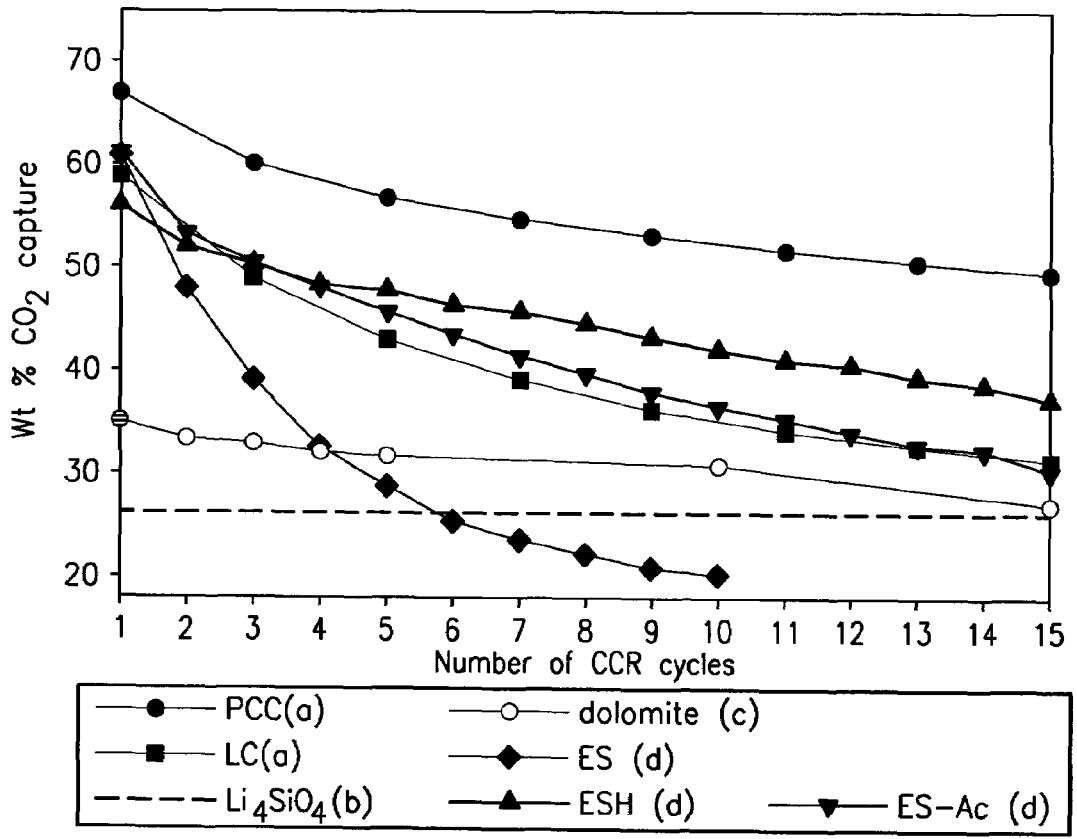
Figure 18C:
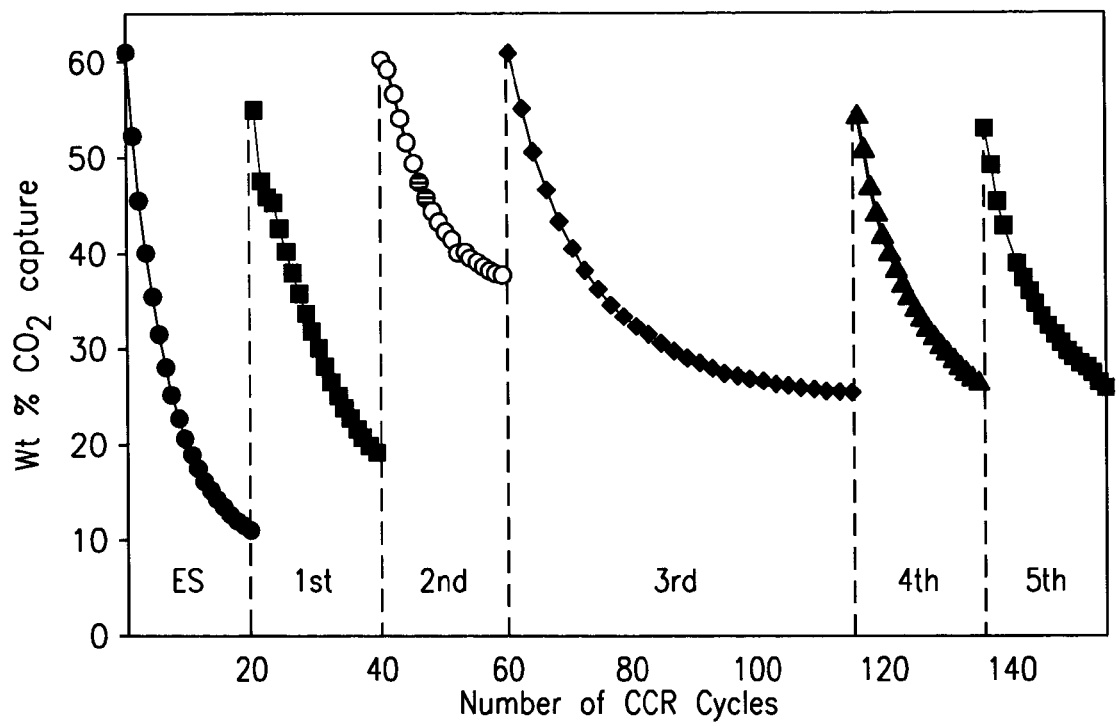

FIG. 18(b) indicates that ES chips lose reactivity from ~60 wt. % in $1^{st}$ cycle to ~20 wt. % capture capacity in the $10^{th}$ cycle. Chemical treatments, such as hydration and acetic acid treatments, modify the morphological characteristics of raw ES to improve the reactivity (see Methods for synthesis details). The acetic acid treatment offers a unique technique for the membrane detachment from the eggshells, which is an alternative to the well known mechanical separation process. The ES-Ac sample shows an enhanced capture capacity of 30.3 wt % even after 15 cycles. The intermediate hydration of the calcined ES or ES-Ac sorbent, after any CCR cycle, improves the sorbent reactivity. Although the ESH sample shows a lower reactivity in the $1^{st}$ cycle (56%), it shows the highest capture capacity of ~37% after 15 cycles compared to the other modified ES samples. FIG. 18(a) also compares the multicyclic performance of ES based sorbents with other high temperature sorbents reported in the literature.[19,26,27] Micron sized PCC-CaO fines show the highest capacity, while the ES pellets show a poor performance over 10 cycles. However, the ESH samples show a considerable improvement in performance compared to ES chips, LC[26] and dolomite[19] fines, and the $Li_4SiO_4$ sorbent from Toshiba Corp., Japan.[27] Intermediate hydration regenerates the sorbent by disrupting the monotonic drop in the reactivity. This sustains the reactivity of the ES sorbent over multiple sets of CCR cycles as shown in FIG. 18(c) for four sets of intermediate hydration.

Advantages of Egg Shells for $CO_2$ Capture

While we have been developing calcium-based sorbents for their use in the high temperature $CO_2$ capture process, we realize the numerous advantages inherent in the usage of eggshells that enhance the viability of this technology. Some of these are discussed below:

Waste-disposal issues: The average per capita egg consumption in the U.S. is about 256 (USDA, 2003). This results in annual eggshell wastes of over 400,000 tons from various retailers, egg processors and hatcheries with an average 5.5 g of eggshell waste from each egg. Even many countries in Europe are equally challenged by this problem. Current disposal options include the most basic landfill, land applications like those of soil mixing and organic farming and recycling as poultry diets. Of these, landfill is the easiest option as other alternatives involve significant processing costs. This technology development has the potential to provide an effective management to the entire eggshell waste generated not only in the US but also in many parts of the world, which currently entails expensive disposal cost and is an environmental nuisance. Their usage in the current process simultaneously provides a comprehensive solution to two global environmental problems. A typical 300 MW power plant, using this $CO_2$ separation technology, will require about 25-250 tons of lime in circulation at any given time (depending on calcination rate). Thus, the annual eggshell waste can cater to the needs of most of the coal-fired power plants in the U.S.

Agglomerated sorbent cost: The current process imposes tremendous strain on the structure due to alternating carbonation and calcination reactions at high temperature. Examples of high temperature reactive sorbents that operate in a similar fashion are rare. However, nature has perfected the ES structure such that it is able to maintain its strength under such conditions. PCC is about $120-200/ton while natural limestone costs about $10-25/ton at the quarry. Grinding and reconstitution for agglomerate synthesis will definitely add to the sorbent cost. In comparison, the disposal cost of ES waste is about $20-70/ton. The use of eggshells is further enhanced by its negative cost compared to other agglomerates.

Reactivity in the kinetically controlled regime: In reality, these sorbents will be exposed only while the reaction occurs in the kinetically controlled regime where the carbonation occurs at a rapid rate. In fact, Eggshell sorbent provides 40 wt % $CO_2$ capture in 6 minutes compared to 10.7 and 11.5 for Linwood Carbonate (LC) and Precipitated Calcium Carbonate (PCC) agglomerates. This would lead to smaller reactors.

Enhanced Hydrogen Production: The production of high purity $H_2$ in coal gasification fuel gas is limited by thermodynamic equilibrium and kinetics of the water gas shift reaction. $H_2$ production can be enhanced by integrated in-situ $CO_2$ removal by driving the temperature dependent equilibrium limited WGS reaction forward. However, rapid kinetics at high temperature can still lead to a higher $H_2$ production by almost complete removal of product $CO_2$ from the gas mixture by carbonation with Eggshell sorbents.

$$CO+H_2O \rightleftharpoons CO_2+H_2 \quad \text{Water gas shift}$$

$$CaO+CO_2 \rightleftharpoons CaCO_3 \quad \text{Carbonation}$$

$$CaCO_3 \rightleftharpoons CaO+CO_2 \quad \text{Calcination}$$

The above mentioned reactions can be utilized to produce $H_2$ with sequestration ready $CO_2$.

Calcination in $CO_2$ atmosphere: PCC and LC based sorbents lose their reactivity significantly at high temperatures. High temperatures are required if we calcine the sorbent in $CO_2$ (in order to maintain the high purity of $CO_2$) as dictated by thermodynamics. PCC and LC thus necessitated the use of sub-atmospheric or steam assisted calcination, both expensive options. However, eggshells have trace amounts of transition metals in them that have been known to lower the calcination temperature. Thus, by calcining at higher $CO_2$ pressure the compression cost of $CO_2$ can be lowered.

Effect of SO2: Eggshell can also capture $SO_2$ by sulfation at high temperatures giving low conversions of about 43% as compared to 80% by PCC. Thus, the parasitic effect of $SO_2$ towards the carbonation reaction is minimal as compared to other calcium sorbents, entailing a lower detrimental effect over multiple Carbonation-Calcination cycles. This is evident from the higher carbonation to sulfation ratio for eggshells observed during the simultaneous carbonation/sulfation experiments as opposed to that for PCC.

In view of the present disclosure or through practice of the present invention, it will be within the ability of one of ordinary skill to make modifications to the present invention, such as through the use of equivalent arrangements and compositions, in order to practice the invention without departing from the spirit of the invention as reflected in the appended claims.

What is claimed is:

1. A method for producing a sorbent, said method comprising the steps of:
    obtaining an eggshell;
    treating said eggshell with an acid so as to form an acid treated eggshell; and
    calcining said acid treated eggshell so as to produce said sorbent.

2. The method according to claim 1 wherein said calcining is conducted under at least partial vacuum.

3. The method according to claim 1 wherein said calcining is conducted by steam.

4. The method according to claim 1 wherein said acid is acetic acid.

5. The method according to claim 1 wherein said acid is in a concentration of from about 1M to about 10M.

6. A method for producing a sorbent, said method comprising the steps of:
    obtaining an eggshell;
    treating said eggshell with an acid to separate an organic membrane from said eggshell so as to form an acid treated eggshell; and
    calcining said acid treated eggshell so as to produce said sorbent.

7. The method according to claim 6 wherein said calcining is conducted under at least partial vacuum.

8. The method according to claim 6 wherein said calcining is conducted by steam.

9. The method according to claim 6 wherein said acid is acetic acid.

10. The method according to claim 6 further comprising cooling said sorbent in flowing $N_2$.

11. A method for producing a sorbent, said sorbent method comprising the steps of:
    obtaining an eggshell;
    treating the said eggshell with an acid to separate an organic membrane from said eggshell;
    calcining said eggshell;
    hydrating said eggshell so as to form a hydrated eggshell; and
    calcining the said hydrated eggshell to so as to produce said sorbent.

12. The method according to claim 11 wherein said calcining is conducted under at least partial vacuum.

13. The method according to claim 11 wherein said calcining is conducted by steam.

14. The method according to claim 11 further comprising cooling the calcined eggshell in flowing $N_2$.

15. The method according to claim 11 wherein water is used to hydrate the eggshell.

16. The method according to claim 11 wherein the eggshell is calcined in $N_2$.

17. The method according to claim 11 wherein the eggshell is calcined at about 700° C.

18. The method according to claim 11 wherein the eggshell is dried at 100° C. in flowing air.

19. A method for producing a sorbent, said method comprising the steps of:
    obtaining an eggshell;
    treating said eggshell with an acid to separate an organic membrane from said eggshell so as to form an acid treated eggshell; and
    calcining said acid treated eggshell so as to produce said sorbent, wherein said sorbent has a $CO_2$ capture capacity of at least about 56% in a first cycle.

20. The method of claim 19 wherein said calcining is conducted under partial pressure.

* * * * *

UNITED STATES PATENT AND TRADEMARK OFFICE
CERTIFICATE OF CORRECTION

PATENT NO. : 7,678,351 B2  Page 1 of 1
APPLICATION NO. : 11/384011
DATED : March 16, 2010
INVENTOR(S) : Iyer et al.

It is certified that error appears in the above-identified patent and that said Letters Patent is hereby corrected as shown below:

Title Page;
In section (56), References Cited, FOREIGN PATENT DOCUMENTS, please delete "DE 265559 A1 3/1989" and insert -- DD 265559 A1 3/1989 --.

Signed and Sealed this

Fifteenth Day of June, 2010

David J. Kappos
*Director of the United States Patent and Trademark Office*